United States Patent
Kurita et al.

(10) Patent No.: US 7,526,782 B2
(45) Date of Patent: Apr. 28, 2009

(54) SHUTTER MEMBER FOR DISC CARTRIDGE, DISC CARTRIDGE AND DISC RECORDING/REPRODUCING APPARATUS

(75) Inventors: Kazuhito Kurita, Kanagawa (JP); Takahiro Yamada, Saitama (JP)

(73) Assignee: Sony Corporation, Tokyo (JP)

( * ) Notice: Subject to any disclaimer, the term of this patent is extended or adjusted under 35 U.S.C. 154(b) by 368 days.

(21) Appl. No.: 10/564,376

(22) PCT Filed: Jul. 23, 2004

(86) PCT No.: PCT/JP2004/010514

§ 371 (c)(1),
(2), (4) Date: Jan. 11, 2006

(87) PCT Pub. No.: WO2005/010884

PCT Pub. Date: Feb. 3, 2005

(65) Prior Publication Data
US 2006/0174258 A1 Aug. 3, 2006

(30) Foreign Application Priority Data
Jul. 28, 2003 (JP) ............................. 2003-281388

(51) Int. Cl.
*G11B 23/03* (2006.01)
(52) U.S. Cl. ...................................... 720/740; 360/133
(58) Field of Classification Search ......... 720/738–744; 360/133
See application file for complete search history.

(56) References Cited

U.S. PATENT DOCUMENTS

| 6,205,116 B1 * | 3/2001 | Hashimoto ................... 720/741 |
| 6,570,841 B1 | 5/2003 | Nakashima |
| 6,597,533 B1 * | 7/2003 | Tanishima ................ 360/99.06 |
| 2001/0055270 A1 * | 12/2001 | Obata et al. .................. 369/291 |
| 2002/0060969 A1 * | 5/2002 | Shimazaki et al. ......... 369/77.2 |
| 2002/0131196 A1 * | 9/2002 | Oishi et al. .................... 360/86 |
| 2004/0062175 A1 * | 4/2004 | Inoue ........................ 369/77.2 |

FOREIGN PATENT DOCUMENTS

| EP | 657882 A2 * | 6/1995 |
| JP | 58146053 A * | 8/1983 |
| JP | 62234282 A * | 10/1987 |
| JP | 07006493 A * | 1/1995 |
| JP | 11-353845 | 12/1999 |
| JP | 11339426 A * | 12/1999 |
| JP | 2000011580 A * | 1/2000 |
| JP | 2001160275 A * | 6/2001 |

(Continued)

Primary Examiner—William J Klimowicz
(74) Attorney, Agent, or Firm—K&L Gates LLP

(57) ABSTRACT

Disclosed is a disc cartridge including a main cartridge body unit (5) in which is rotatably housed an optical disc (2). The disc cartridge includes a recording and/or reproducing aperture (13) for exposing a portion of the optical disc to outside across the inner and outer rims of the disc, a shutter unit (15) mounted for movement to the main cartridge body unit for opening/closing the recording and/or reproducing aperture and a lock unit (27) for locking the shutter unit (15) in a position of closing the recording and/or reproducing aperture. The lock unit includes a lock member (28), rotatably mounted to the shutter unit, and an engaging part (29), provided to the main cartridge body unit, so as to be engaged by the lock member (28).

6 Claims, 22 Drawing Sheets

FOREIGN PATENT DOCUMENTS

| | | | | |
|---|---|---|---|---|
| JP | 2001351355 | A | * | 12/2001 |
| JP | 2001357650 | A | * | 12/2001 |
| JP | 2003030950 | A | * | 1/2003 |
| JP | 2003141845 | A | * | 5/2003 |
| JP | 2003173606 | A | * | 6/2003 |
| JP | 2003196944 | A | * | 7/2003 |

* cited by examiner

SHUTTER MEMBER FOR DISC CARTRIDGE, DISC CARTRIDGE AND DISC RECORDING/REPRODUCING APPARATUS

TECHNICAL FIELD

This invention relates to a disc cartridge, having a disc-shaped recording medium, such as an optical disc, held therein, a shutter member used for this disc cartridge, and a disc recording and/or reproducing apparatus, employing the disc cartridge as a storage medium.

This application claims priority based upon the Japanese Patent Application 2003-281388, filed in Japan on Jul. 28, 2003, the entirety of which is incorporated by reference herein.

BACKGROUND ART

Up to now, a disc cartridge, having a disc-shaped recording medium, such as an optical disc, rotatably housed therein, and which is loaded on a disc recording and/or reproducing apparatus, is housed therein as a disc-shaped recording medium, has been in use extensively. This sort of the disc cartridge, comprising a disc-shaped recording medium, housed in a main cartridge body unit, can be loaded/unloaded for the disc recording and/or reproducing apparatus, with the disc-shaped recording medium in a protected state.

Meanwhile, the size of the disc cartridge has to be reduced to as small a value as possible, in keeping with the size of the disc-shaped recording medium, in order to reduce the size of the disc recording and/or reproducing apparatus, employing the disc cartridge, in order to provide for facilitated handling of the disc cartridge, and in order to save the cartridge material and hence the production cost.

A disc cartridge, reduced in size in keeping with the size of the disc-shaped recording medium, housed therein, is disclosed in, for example, the Japanese Laid-Open Patent Publication H11-353845 (Patent Publication 1). In this disc cartridge, disclosed in the Patent Publication 1, the lateral side thereof corresponding to the inserting end into the recording and/or reproducing apparatus, is substantially arcuate-shaped to reduce the size of the disc cartridge.

With the disc cartridge, disclosed in the Patent Publication 1, the reduction in size achieved is not sufficient.

In the disc cartridge, disclosed in the Patent Publication 1, a shutter member, adapted for opening/closing a recording/reproducing aperture, is biased in the closing direction, by a biasing member, for reliably closing the recording/reproducing aperture for reliably protecting the disc-shaped recording medium, housed in the main cartridge body unit. Since the biasing member, provided in the disc cartridge, is formed by a spring plate, elastically deformed when thrust, it may become difficult to cause the biasing member to be elastically deformed reliably to unlock and to cause movement of the shutter member.

DISCLOSURE OF THE INVENTION

It is an object of the present invention to provide a disc cartridge the size of which may further be reduced in comparison with the disc housed therein.

It is another object of the present invention to provide a shutter member for a disc cartridge, and a disc cartridge, in which the recording/reproducing aperture provided in the main cartridge body unit may be reliably closed, as the shutter member for opening/closing the recording/reproducing aperture is moved readily reliably, in order to protect the disc accommodated in the main cartridge body unit reliably.

It is yet another object of the present invention to provide a disc recording and/or reproducing apparatus in which a disc cartridge that may be reduced in size further in comparison with the disc housed therein may be used as a recording medium.

In one aspect, the present invention provides a shutter unit for a disc cartridge comprising a shutter unit for opening/closing an aperture of a disc cartridge, having a disc accommodated in the inside thereof, the aperture serving for exposing a portion of a recording area of the disc to outside, a lock unit rotationally mounted to the shutter unit and adapted for engaging with an engagement part provided to the disc cartridge, and biasing means for biasing the shutter unit in a direction of engaging with the engagement part. The aperture serves for exposing a portion of a recording area of the disc to outside, In another aspect, the present invention provides a disc cartridge comprising a disc, a main cartridge body unit having the disc rotatably housed therein and including an aperture for exposing a part of the disc across the inner and outer rims of the disc, a shutter unit mounted movably to the main cartridge body unit for opening or closing the aperture, a lock unit for locking the shutter unit in a position of closing the aperture, an engagement part provided to the main cartridge body unit for engagement by the lock member, and a biasing member for biasing the lock unit in a direction of engaging with the engagement part.

The lock unit is rotated by a shutter unit movement controlling means so as to be disengaged from the engagement part. The shutter unit movement controlling means is mounted to a recording and/or reproducing apparatus for controlling the movement of the shutter unit relative to the main cartridge body unit.

An inserting end of the main cartridge body unit into the recording and/or reproducing apparatus is a substantially semicircular arcuate section, centered about the center of the disc-shaped recording medium, accommodated in the main cartridge body unit. The aperture is formed for opening to a lateral side of the main cartridge body unit other than the lateral side formed as the arcuate section. The shutter unit is moved along the lateral side of the main cartridge body unit other than the lateral side formed as the arcuate section for opening/closing the recording and/or reproducing aperture.

In the disc cartridge of the present invention, the lock member of the lock unit, designed to lock the shutter unit in the position of closing the recording and/or reproducing aperture, is moved along with the shutter unit to unlock the shutter unit in relation with the operation of loading the disc cartridge to the recording and/or reproducing apparatus.

In yet another aspect, the present invention provides a recording and/or reproducing apparatus comprising a cartridge holder into which is inserted a disc cartridge including a disc, a main cartridge body unit having the disc rotatably housed therein and including an aperture for exposing a part of the disc across the inner and outer rims of the disc, a shutter unit mounted movably to the main cartridge body unit for opening or closing the aperture, a lock unit for locking the shutter unit in a position of closing the aperture, an engagement part provided to the main cartridge body unit for engagement by the lock member, a biasing member for biasing the lock unit in a direction of engaging with the engagement part, a shutter unit movement controlling part provided to one side of the cartridge holder, and a recording and/or reproducing unit for recording and/or reproducing the information for the disc cartridge introduced into the cartridge holder. The lock unit is rotated by the shutter unit movement controlling part when the disc cartridge is introduced into the cartridge holder to release the engagement by the engagement part.

With the disc cartridge according to the present invention, in which the rotatable lock member of the lock unit is mounted to the shutter unit rotated relative to the main cartridge body unit, and hence there is no necessity of providing an area for mounting the rotating lock member, the main cartridge body unit may be reduced in size. In particular, the lock member may be provided so that, when the shutter member is in the closure position, the lock member is positioned over the recording and/or reproducing aperture, thus further reducing the size of the disc cartridge.

With the disc cartridge according to the present invention, in which one of the lateral sides of the main cartridge body unit is a substantially semicircular arcuate section, centered about the center of the disc-shaped recording medium, accommodated in the main cartridge body unit, at least one of the lateral sides of the main cartridge body unit is proximate to the substantially semi-circular shape of the disc, accommodated therein, thus further reducing the size of the main cartridge body unit.

With the disc cartridge according to the present invention, in which the inserting side into the recording and/or reproducing apparatus is a substantially semicircular arcuate section, the direction of insertion thereof into the recording and/or reproducing apparatus may be discriminated readily for reliably prohibiting the mistaken insertion operation.

Moreover, with the disc cartridge according to the present invention, in which the recording and/or reproducing aperture is formed for opening in the lateral side of the main cartridge body unit, other than the lateral side thereof formed as the arcuate section, the shutter unit for opening/closing the recording and/or reproducing aperture may be stably mounted to the main cartridge body unit, thus reliably closing the recording and/or reproducing aperture.

Additionally, with the disc cartridge according to the present invention, the recording and/or reproducing aperture may be opened by simply introducing the disc cartridge into the cartridge holder to unlock the shutter, thus assuring facilitated loading of the disc cartridge.

Other objects and advantages of the present invention will become more apparent from the description of the following embodiments thereof especially when read in conjunction with the drawings.

BEST MODE FOR CARRYING OUT THE INVENTION

Figure 1:
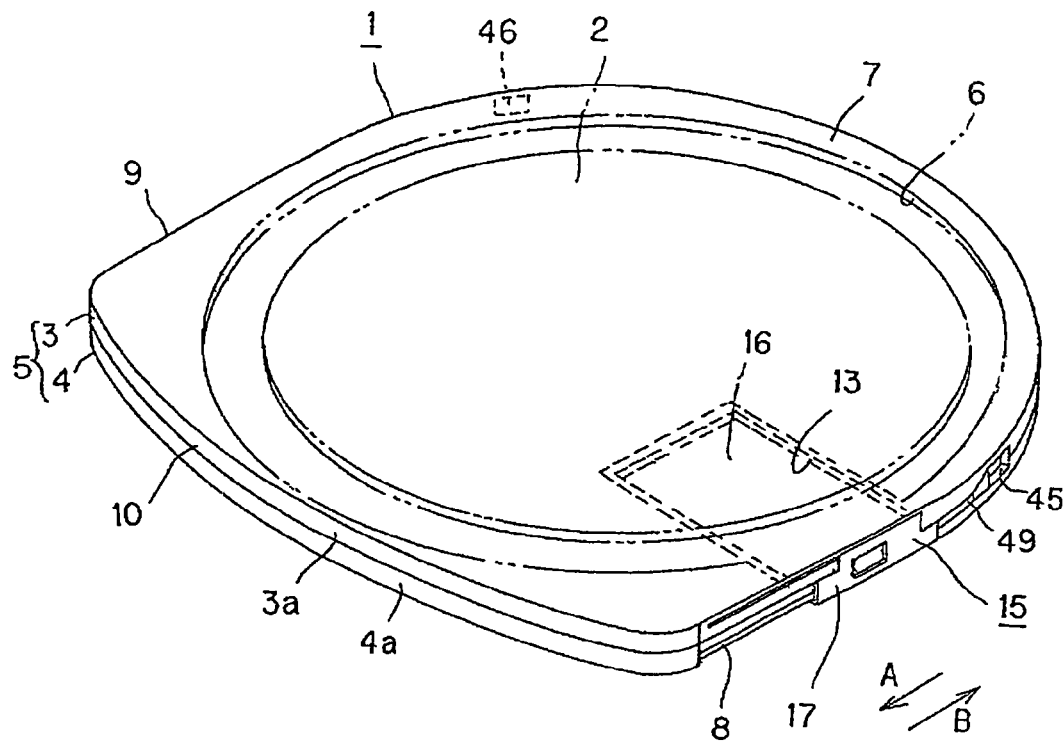
FIG. 1 is a perspective view showing a disc cartridge according to the present invention, looking from an upper cartridge half side.

Referring now to the drawings, a disc cartridge according to the present invention is explained in detail.

Figure 2:
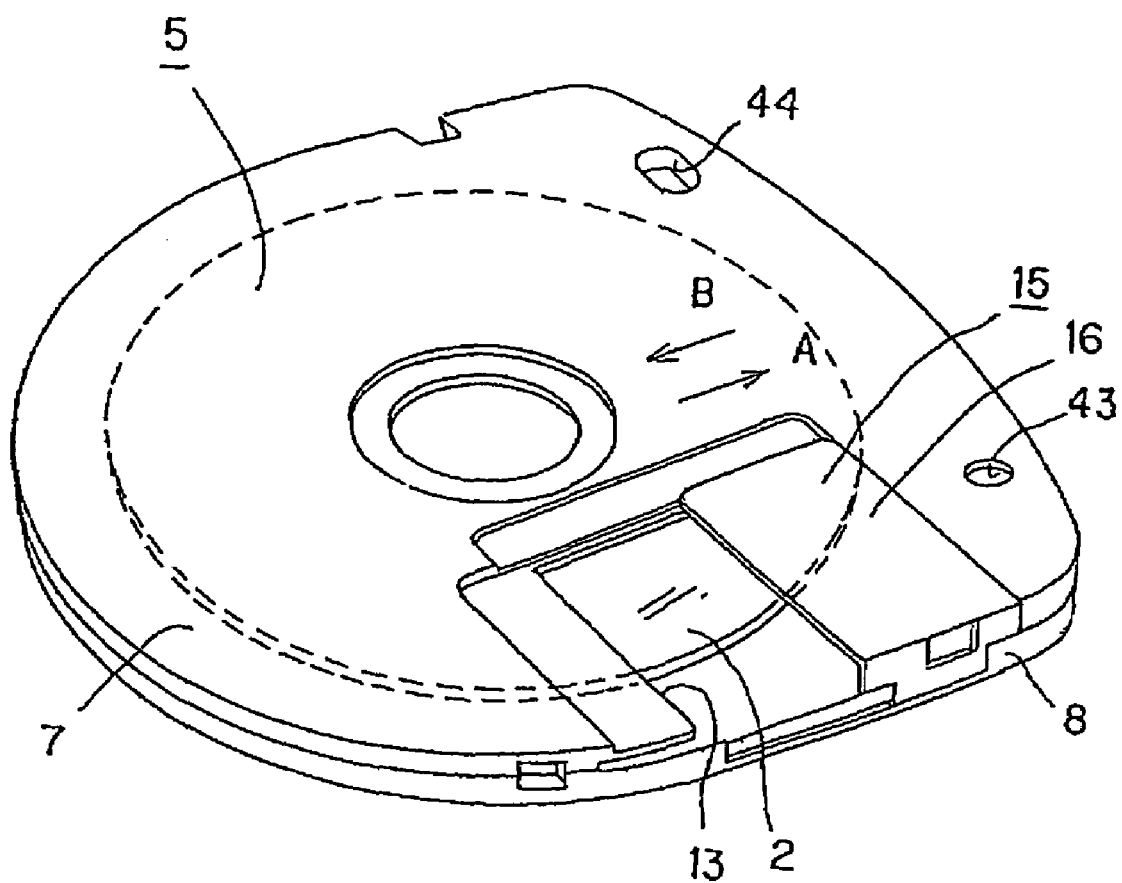
FIG. 2 is a perspective view showing a disc cartridge according to the present invention, looking from a lower cartridge half side.

A disc cartridge 1 according to the present invention houses therein an optical disc 2, as a disc-shaped recording medium, for rotation therein, and includes a main cartridge body unit 5, made up by upper and lower cartridge halves 3, 4, abutted and bonded together, as shown in FIGS. 1 and 2. The optical disc 2 is rotatably housed within this main cartridge body unit 5.

The disc cartridge 1 according to the present invention houses therein the optical disc 2, on which there are recorded program data or video data for executing e.g. a television game, and is of an extremely small size. The present disc cartridge 1 houses therein a small-sized optical disc 2 with a diameter on the order of, for example, 60 mm, and is of a size that can be held in a user's palm.

Meanwhile, the optical disc 2, housed in the present disc cartridge 1, is a replay-only disc, having information signals, such as program data, prerecorded thereon.

The upper and lower cartridge halves 3, 4, making up a main body unit 5, housing the disc cartridge 1, is molded from a synthetic resin material, and upstanding peripheral wall sections 3a, 4a are formed on the outer rim of the halves 3a, 4a, respectively. The upper and lower cartridge halves 3, 4 are bonded together, with the peripheral wall sections 3a, 4a abutting to each other, thereby forming a main cartridge body unit 5 delimiting a disc housing section 6 therein. The upper and lower cartridge halves 3, 4 are bonded to each other to form the main cartridge body unit 5, applying a welding technique, such as an ultrasonic welding technique, to welding projections formed upright on the sides of the upper and lower cartridge halves 3, 4 facing each other.

Figure 3:
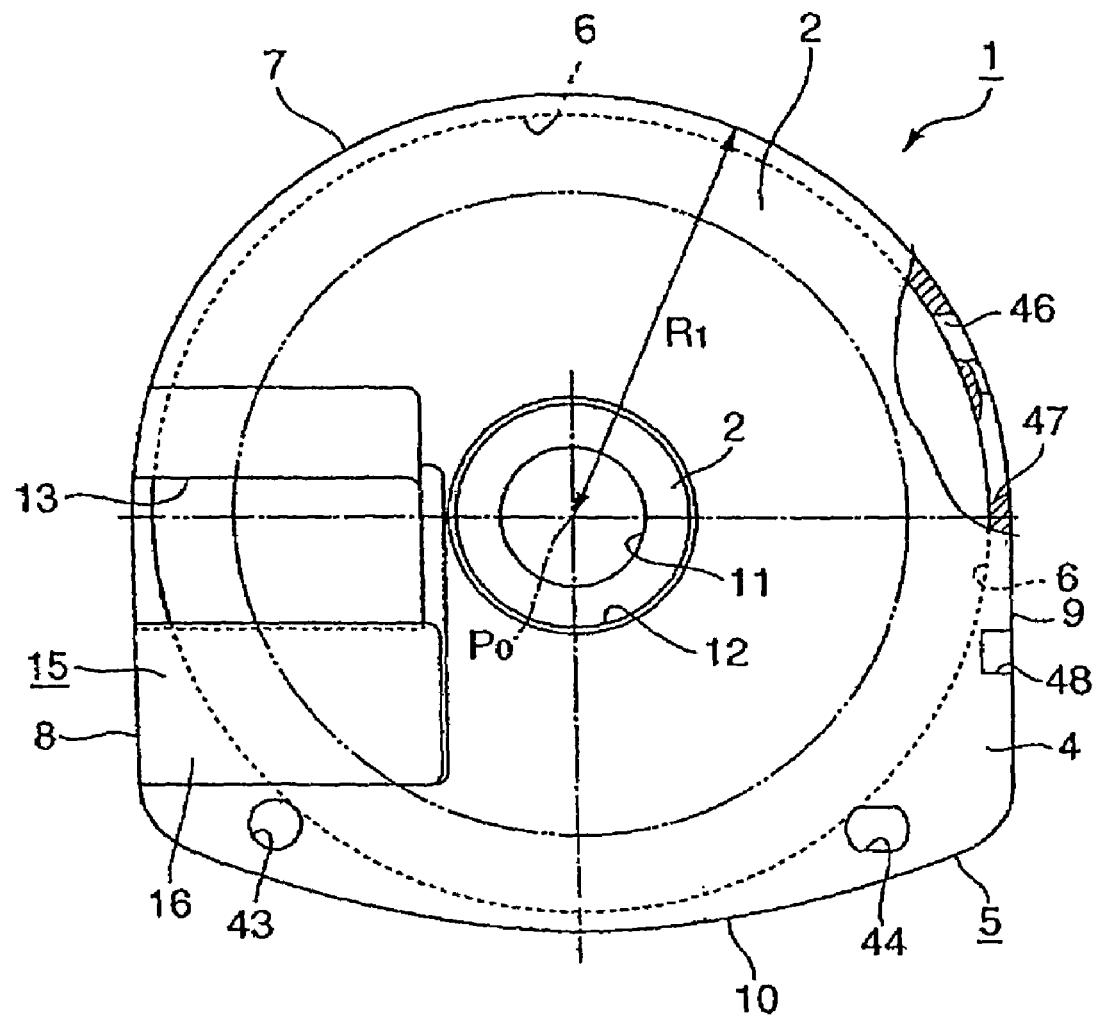
FIG. 3 is a plan view showing a disc cartridge according to the present invention, looking from a lower cartridge half side.

The main cartridge body unit 5, forming the disc cartridge 1 according to the present invention, has its front side, as an inserting side end of the disc cartridge 1 into the disc recording and/or reproducing apparatus, formed as an arcuate section 7, as shown in FIGS. 1 to 3. This arcuate section 7 is formed to a semicircle of the optical disc 2 of a radius R1 housed within the disc housing section 6 of the main cartridge body unit 5, with the center of the disc as a center P0 of the semicircle, as shown in FIG. 3. That is, the arcuate section 7 is formed as a semicircle commensurate with the semicircle of the optical disc 2 housed within the main cartridge body unit 5.

The facing lateral sides of the main cartridge body unit 5, consecutive to the arcuate section 7 of the main cartridge body unit 5, are formed as sides 8, 9 parallel to each other, while the back side of the main cartridge body unit 5, lying opposite to the arcuate section 7, is formed as a uniformly smoothly curved section 10. That is, the back side of the main cartridge body unit 5 is formed as the curved section 10 of an arc of a circle having a radius larger than that of the semicircular arcuate section 7, formed on the front side of the main cartridge body unit 5, that is, a curvature smaller than that of the semicircular arcuate section 7.

With the disc cartridge 1 of the present invention, the front side thereof, as an inserting side surface, is a substantially semicircular arcuate section 7 of a curvature larger than the other side, opposite thereto, so that, when the disc cartridge is inserted in the slot-in style via cartridge insertion/ejection opening, the direction of insertion into the disc recording and/or reproducing apparatus can be identified extremely readily. In particular, with the disc cartridge 1, reduced in size so as to be held in the user's palm, the direction of insertion can be identified by the sensual touch feeling, thus prohibiting mistaken insertion to enable correct loading on the disc recording and/or reproducing apparatus. Moreover, with the present disc cartridge 1, insertion into a slot-in type disc recording and/or reproducing apparatus may be facilitated, while positive insertion may be assured.

Moreover, the disc cartridge 1 may be further reduced in size, as compared to the optical disc 2, accommodated therein, by having the inserting end side formed as a substantially semicircular arcuate section 7, and by having the back side opposite to the arcuate section 7 similarly formed as a curved section 10.

At a mid part of the lower cartridge half 4, forming the lower surface of the main cartridge body unit 5, there is formed a circular center opening 12 for exposing a center hole 11 of the optical disc 2 housed in the main cartridge body unit 5 and the ambient part thereof to outside, as shown in FIGS. 2 and 3. Into this center opening 12 is intruded a relevant portion, such as a turntable, of a disc rotating driving mechanism, provided to the disc recording and/or reproducing apparatus on which the disc cartridge 1 is loaded.

In the lower cartridge half 4, forming the lower surface of the main cartridge body unit 5, there is formed an aperture for the head part 13, operating as a recording/reproducing aperture. The aperture for the head part 13 is provided to the lateral side 8 of the main cartridge body unit 5, and is formed as a rectangular aperture sized so as to be large enough to permit a signal recording region of the optical disc 2 accommodated in the main cartridge body unit 5 to be exposed to outside across the inner and outer rims of the disc. That is, the aperture for the head part 13 is formed for being opened in the linear flat lateral side 8 different from the front side of the main cartridge body unit 5 carrying the arcuate section 7.

A shutter unit 15 for opening/closing the aperture for the head part 13 is movably mounted to the disc cartridge 1. The shutter unit 15 includes a flat-plate-shaped shutter member 16 of a rectangular shape large enough to close the aperture for the head part 13 and a retention part 17 of a U-shaped cross-section formed at the proximal side of the shutter member 16.

The shutter unit 15 is formed by punching and warping a thin metal sheet or by shaping a synthetic resin material.

Figure 4:
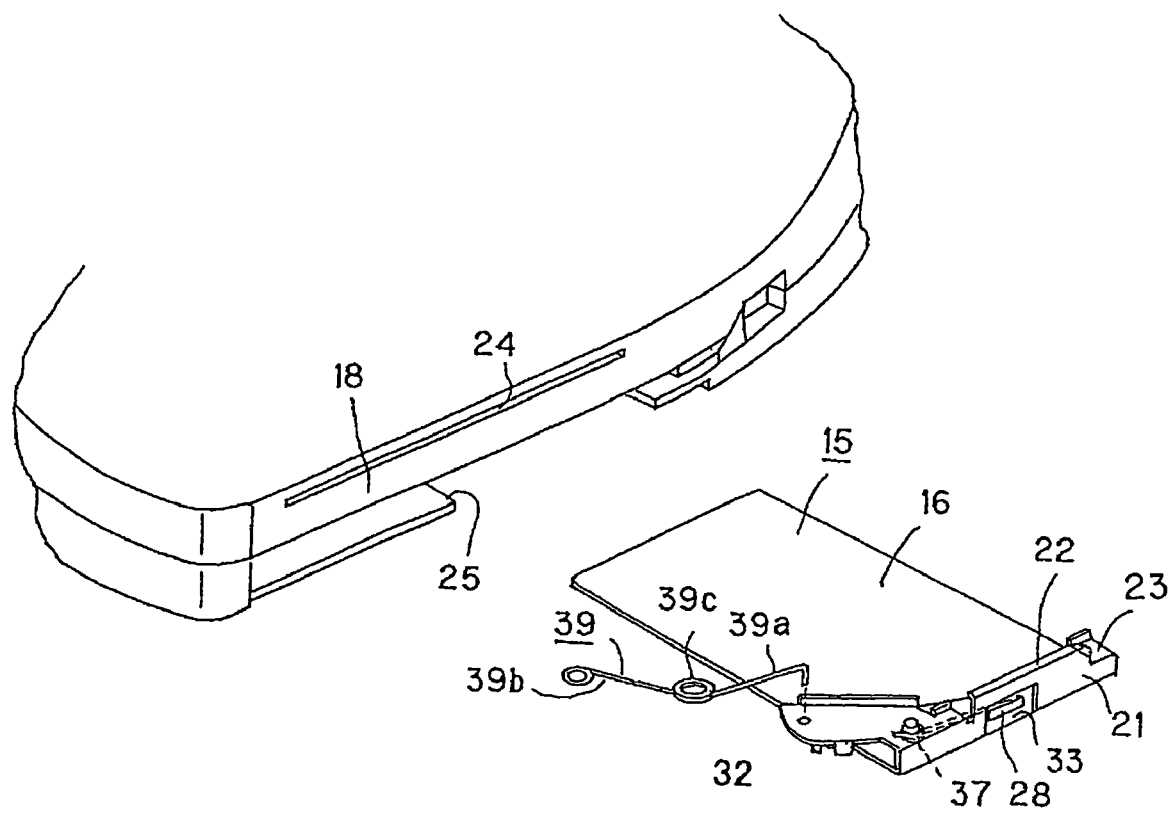
FIG. 4 is a perspective view showing a shutter unit and a main cartridge body unit carrying this shutter unit.

The shutter unit 15 is designed so that the upper cartridge half 3 of the cartridge body unit 5 is carried by the retention part 17. The shutter unit 15 itself is carried for movement in the directions indicated by arrows A and B for opening/closing the aperture for the head part 13. That is, the shutter unit 15 mounted for movement on the main cartridge body unit 5 by a slide guide 18 being carried by the retention part 17, as shown in FIG. 4. The slide guide 18 is formed by a portion of an upstanding peripheral wall section 3a of the upper cartridge half 3.

Figure 5:
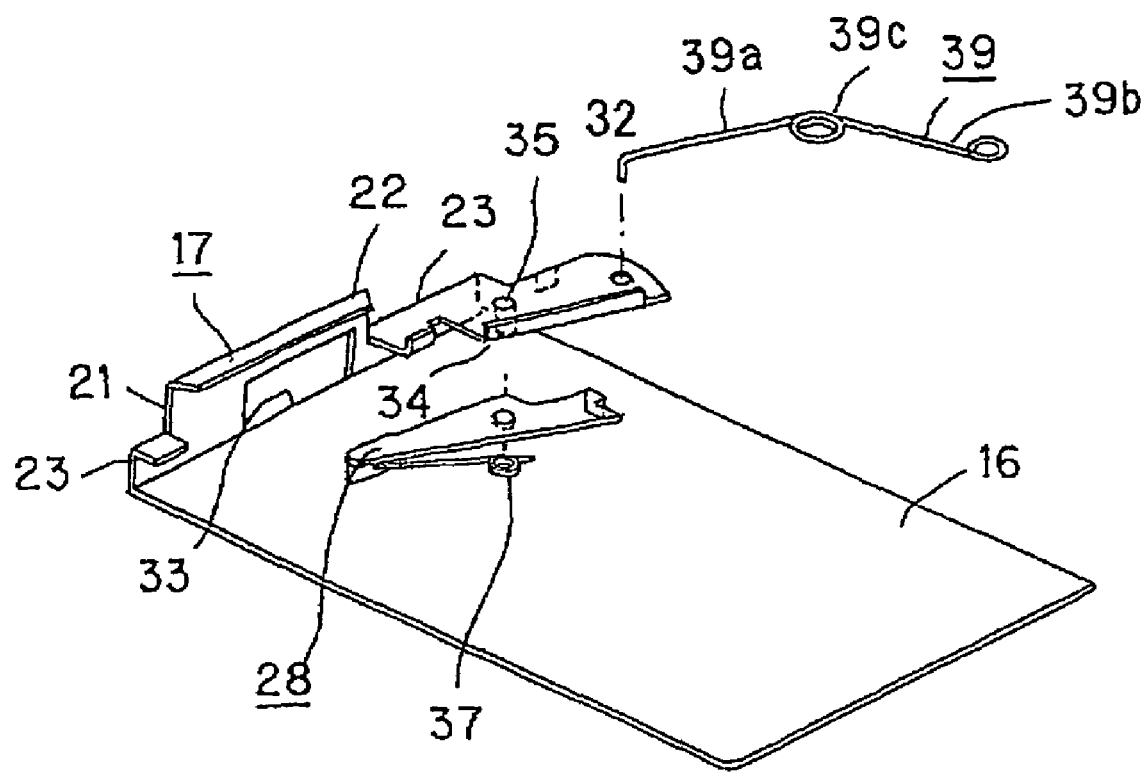
FIG. 5 is a perspective view showing a shutter unit and a shutter member lock unit mounted on this shutter unit.

Referring to FIGS. 4 and 5, the retention part 17, provided to the shutter unit 15, is formed with a connecting piece 21 upstanding from the proximal end of the shutter unit 16, and a first engagement piece 22, bent towards the shutter unit 16, is provided to the distal end of the connecting piece 21. On both sides of the connecting piece 21, a second engagement piece 23, bent in an L-shape, is formed at a lower position than the first engagement piece 22. Meanwhile, the second engagement piece 23 is bent in an L-shape so that its distal end is protruded towards the first engagement piece 22.

Figure 6:
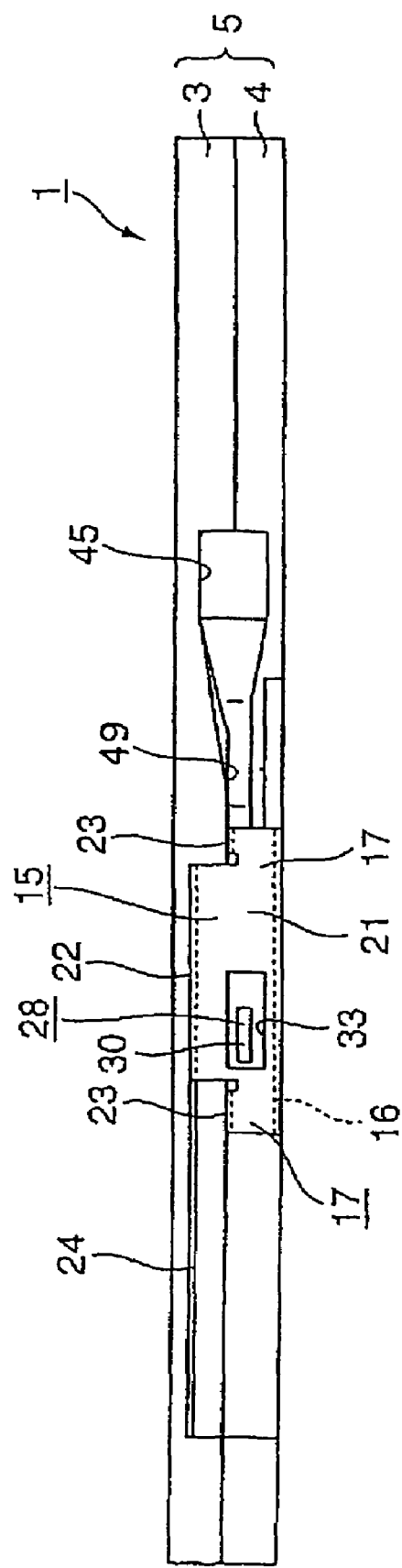
FIG. 6 is a side view showing the lateral side of the disc cartridge, carrying the shutter unit, according to the present invention.
Figure 7:
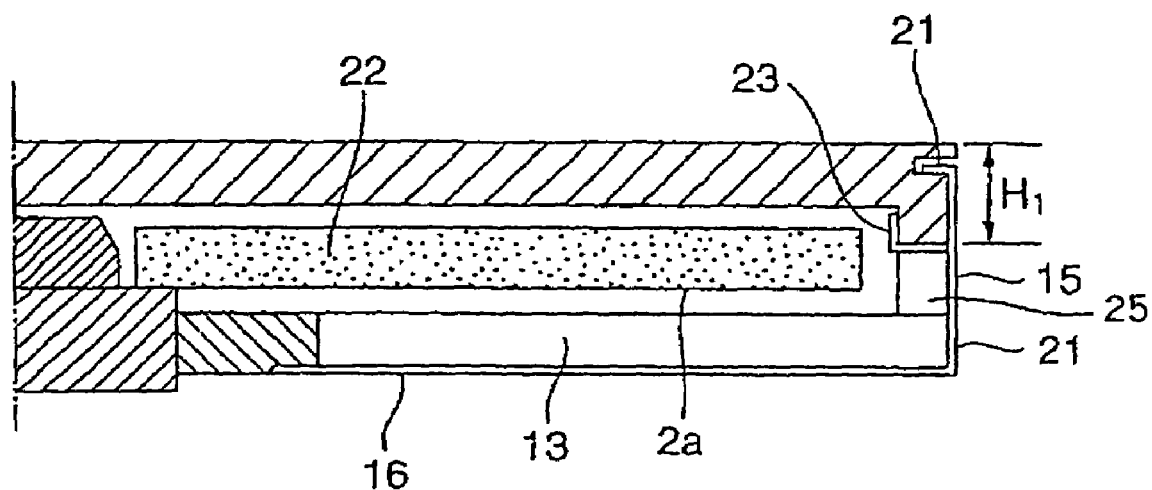
FIG. 7 is a cross-sectional view showing the shutter unit mounted to the main cartridge body unit.

The shutter unit 15 is arranged on the main cartridge body unit 5 so that the shutter member 16 is extended over the aperture for the head part 13, as shown in FIG. 2. At this time, the shutter unit 15 holds the retention part 17 in a clinching fashion by the first and second engagement pieces 22, 23, by the first engagement piece 22 of the retention part 17 engaging in an engagement groove 24 formed in the lateral side of the slide guide 18 and by the L-shaped second engagement piece 23 engaging with the distal end of the slide guide 18, as shown in FIGS. 6 and 7. The shutter unit 15, carried in this manner, is moved in the directions indicated by arrows A and B for opening/closing the aperture for the head part 13, by being guided by the retention part 17.

The area of the lower cartridge half 4, traversed by the shutter member 16, is formed with a recessed shutter slide part 19. This shutter slide part 19 is formed to a depth such that the shutter member 16 is not protruded from the surface of the main cartridge body unit 5.

In the disc cartridge 1 of the present invention, a cut-out 25 is formed in a region of the upstanding peripheral wall section 4a of the lower cartridge half 4 facing the aperture for the head part 13, as shown in FIGS. 5 and 7. That is, the aperture for the head part 13 serves for exposing an area of the main cartridge body unit 5 extending from the inner rim up to the outer rim of the main cartridge body unit 5.

Referring to FIG. 7, at least the part of the slide guide 18 of the upper cartridge half 3 facing the aperture for the head part 13 is of a height H1 not protruding from the lower surface 2a of the optical disc 2 facing the lower cartridge half 4 when the optical disc 2 in the disc cartridge 1 loaded in position along the height-wise direction in the cartridge loading section in the disc recording and/or reproducing apparatus has been loaded in position on the turntable.

With the above-described disc cartridge 1, when the shutter unit 15 is moved to open the aperture for the head part 13, the optical pickup, as a head part for reading out the information signals recorded on the optical disc 2, may be located in its entirety within the main cartridge body unit 5. In addition, when the optical pickup has been moved to a position scanning the outer rim of the optical disc 2, the optical blocks other than an objective lens, converging the light beam, used for scanning the signal recording area of the optical disc 2, may be located outside the main cartridge body unit 5, as the objective lens is located within the main cartridge body unit 5.

As a result, with the disc cartridge 1 of the present invention, the optical pickup may be located across the inner part and an outer part of the main cartridge body unit 5, as the optical pickup is proximate to the optical disc 2. Thus, the signal recording area may be formed up to the outer rim of the optical disc 2, thereby increasing the recording capacity of the optical disc 2. Moreover, since the optical pickup may be proximate to the optical disc 2, the numerical aperture NA of the objective lens may be larger, while the spot of the light beam condensed on the optical disc 2 may be smaller, thereby increasing the recording density of the information signals recorded on the optical disc 2. Since the recording density may be improved with increase in the recording capacity, the optical disc in need of a preset recording capacity may be reduced in diameter. Since the optical disc 2 may be scanned as the optical pickup is positioned for movement across the inner and outer parts of the main cartridge body unit 5, the main cartridge body unit 5 may be reduced in size, whilst the disc recording and/or reproducing apparatus, employing the disc cartridge 1, may also be reduced in size.

In the disc cartridge 1, according to the present invention, the shutter unit 15, opening/closing the aperture for the head part 13, is mounted for movement along the flat lateral surface 8 of the main cartridge body unit 5, as shown in FIGS. 1 and 2. Thus, the shutter unit 15 is moved linearly with the retention part 17 contacting with the planar lateral surface 8, and hence may be moved in stability.

Since the aperture for the head part 13 is formed at a location facing the flat lateral side 8 of the main cartridge body unit 5, part of the lower cartridge half 4 carrying the cut-out 25 is also formed as a linear surface. Thus, with the aperture for the head part 13, formed with the cut-out 25 and opened on the side of the lateral surface 8 of the main cartridge body unit 5 facing to outside, it is possible to close the rectangular-shaped shutter unit 15, carrying a linear U-shaped retention part 17, more reliably.

The disc cartridge 1 according to the present invention is provided with a lock unit 27 for prohibiting the movement of the shutter unit 15 when the shutter unit 15 has been moved to a position closing the aperture for the head part 13. The lock unit 27 of the shutter unit 15 includes a lock lever 28, mounted for rotation to the shutter unit 15, and an engagement part 29 on the main cartridge body unit 5, engaged by this lock lever 28, as shown in FIGS. 5 and 8.

Figure 8:
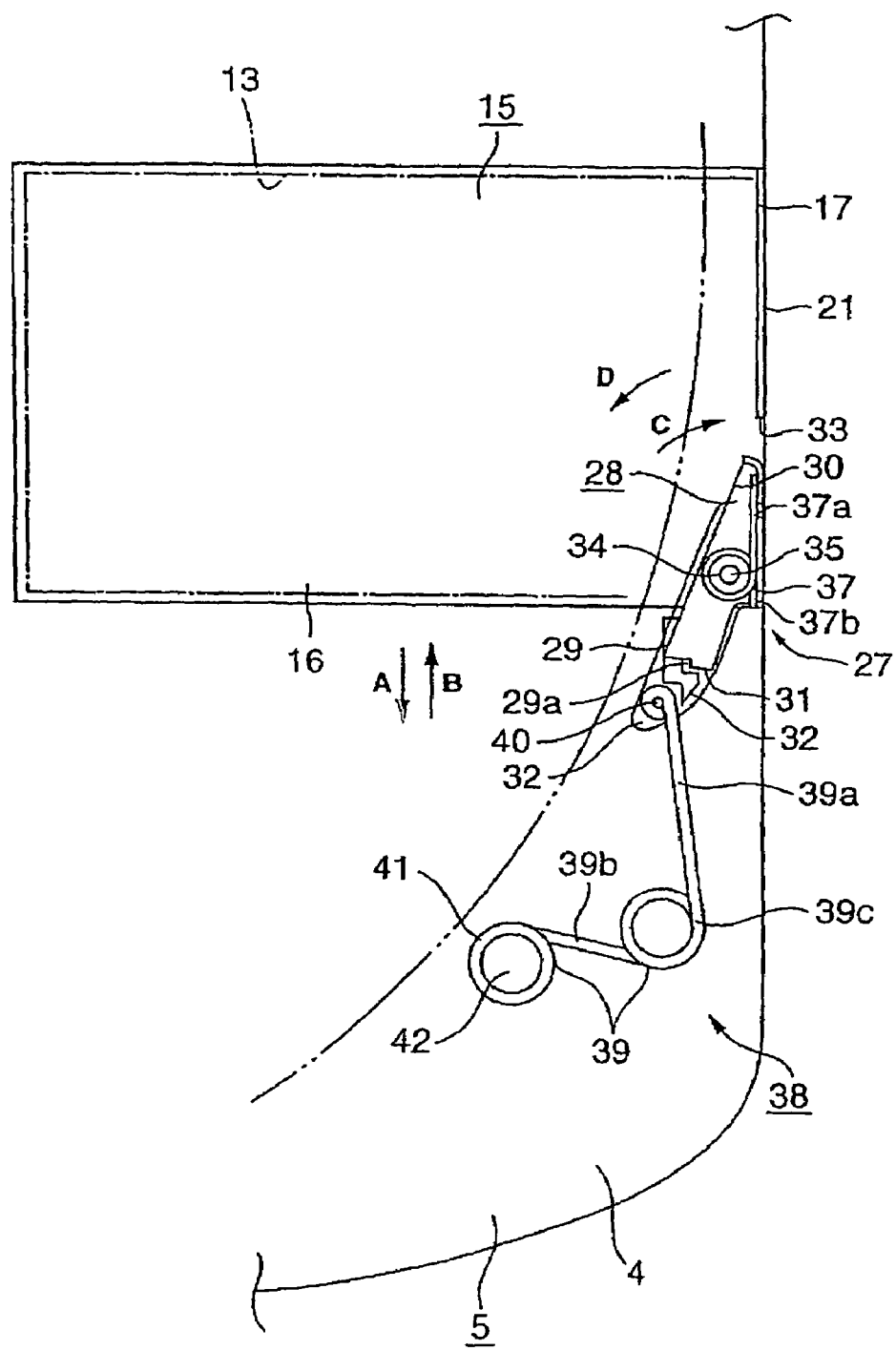
FIG. 8 is a plan view showing the shutter unit locked by the shutter member lock unit.

The lock lever 28, forming a lock member of the lock unit 27, is formed as an elongated plate-shaped member, including an upstanding thrust part 30, extending along a lateral side edge thereof, and an upstanding engagement piece 31 on the opposite side for engagement by the engagement part 29, as shown in FIGS. 5 and 8. The lock lever 28 is rotationally mounted on a lock lever mounting piece 32 provided to the shutter unit 15. The lock lever mounting piece 32 is formed for protruding laterally of the shutter member 16 from the upper edge of the connecting piece 21 forming the slide guide 18.

The lock lever 28 is rotatably mounted about a pivot 35 as the center of rotation, so that the thrust part 30 at one end thereof faces a rectangular window 33 formed at a mid portion of the connecting piece 21, as shown in FIGS. 1, 6 and 8. At this time, the engagement piece 31, provided to the opposite side of the lock lever 28, is protruded laterally of the shutter member 16 for extending along the lock lever mounting piece 32.

A window 33 formed in the connecting piece 21 of the shutter unit 15 is engaged by a shutter unit movement inhibiting spring, provided for inhibiting movement of the shutter unit 15 to the disc recording and/or reproducing apparatus, to which the disc cartridge 1 is mounted.

The lock lever 28, carried by the shutter unit 15, is rotationally biased by a rotational force energizing spring 37, coiled about the pivot 35, in a direction shown by an arrow C in FIG. 8 for protruding the thrust part 30 from the window 33. The rotational force energizing spring 37 is formed by a torsion coil spring, and has one arm section 37a retained by the thrust part 30, while having the other arm section 37b retained by the inner surface of the connecting piece 21 of the shutter unit 15, for rotationally biasing the lock lever 28 in the direction indicated by arrow C in FIG. 8.

The rotational position of the lock lever 28 by the rotational force energizing spring 37 is determined by abutment of the side of the lock lever 28 carrying the thrust part 30 against the connecting piece 21.

The shutter unit 15, carrying the lock lever 28 as described above, is mounted for movement to the main cartridge body unit 5, by having the retention part 17 carried by the upper cartridge half 3, as described above.

When the shutter unit 15 is at a position of closing the aperture for the head part 13, as shown in FIGS. 6 and 8, the lock lever 28 is rotated in the direction of arrow C in FIG. 8, under the biasing force of the rotational force energizing spring 37, for intruding the thrust part 30 into the window 33 formed in the connecting piece 21. At this time, the lock lever 28 inhibits movement of the shutter unit 15, by the engagement piece 31 thereof engaging with a mating engaging part 29, provided to the main cartridge body unit 5, while retaining the aperture for the head part 13 in a state of closure by the shutter unit 16.

The mating engaging part 29 of the main cartridge body unit 5 is provided to an area of the inner surface of the lower cartridge half 4, outside the area of the disc housing section 6, which may be engaged by the engagement piece 31 of the lock lever 28 when the shutter unit 15 is in the closure position. The mating engaging part 29 is formed as one with the lower cartridge half 4. The mating engaging part 29 is formed with an engagement recess 29a opened on one side. In this engagement recess 29a is intruded the engagement piece 31 provided to the lock lever 28.

Figure 9:
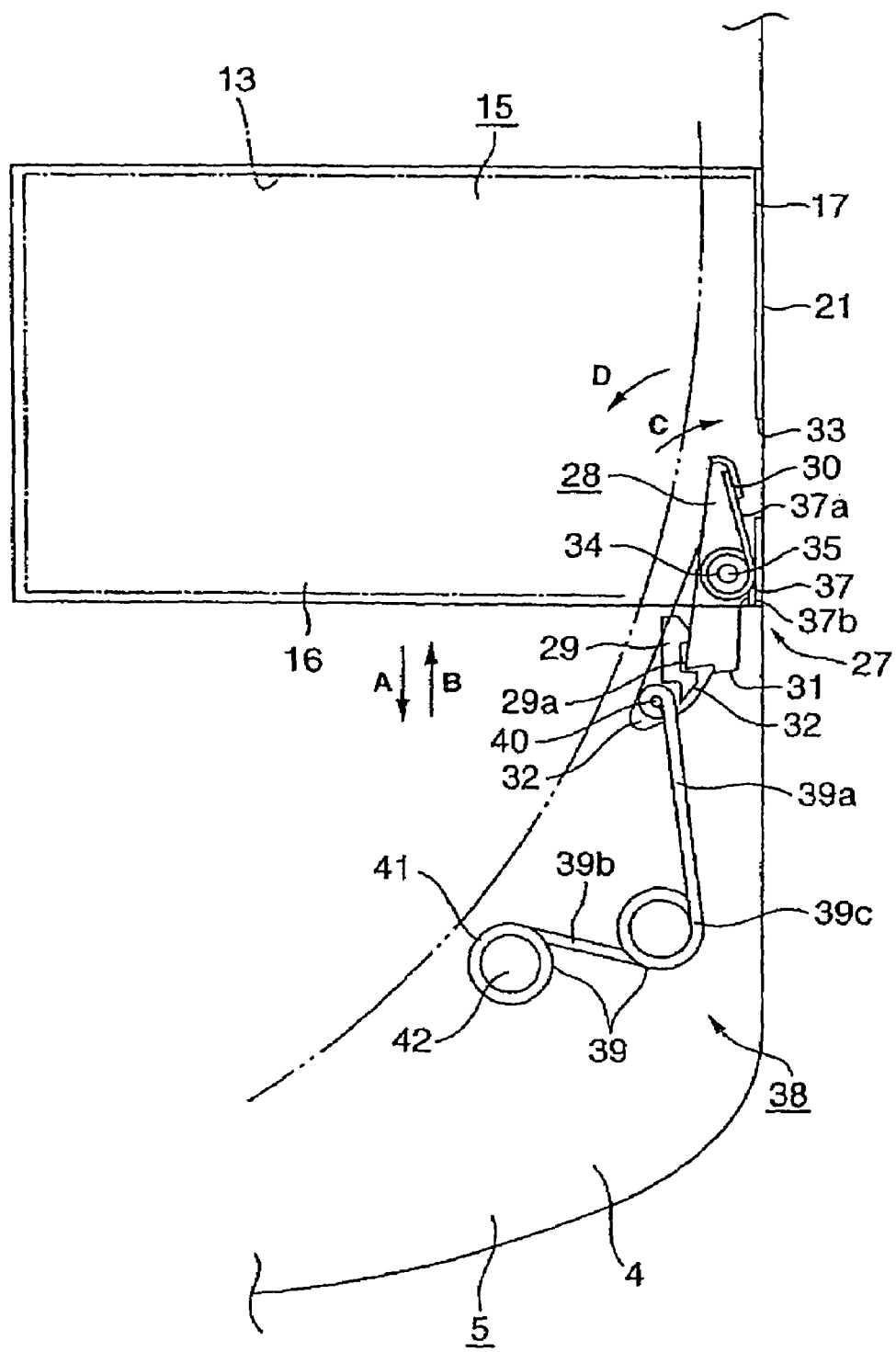
FIG. 9 is a plan view showing the shutter unit in the unlocked state.

When the disc cartridge 1 is introduced into the disc recording and/or reproducing apparatus, the lock lever 28, which has locked the shutter unit 15 in the closure position, is rotated in the direction indicated by arrow D in FIG. 8, against the bias of the rotational force energizing spring 37, by the thrust part 30 being thrust by the shutter unit movement inhibiting spring, forming a shutter opening part, intruded into engagement with the window 33 formed in the connecting piece 21. When the lock lever 28 is rotated in the direction of the arrow D in FIG. 8, the engagement piece 31 is disengaged from the engagement recess 29a of the mating engaging part 29, as shown in FIG. 9, for detaching the engagement piece 31 from the engagement recess 29a of the mating engaging part 29, thereby unlocking the shutter unit 15. The shutter unit 15 may now be movable along the direction of the arrow A in FIG. 2, that is, in a direction of opening the aperture for the head part 13.

Meanwhile, the opening/closure of the aperture for the head part 13 is by relative movement between the main cartridge body unit 5 and the shutter unit 15. The opening/closure of the aperture for the head part 13 will be explained in detail subsequently.

With the above-described lock unit 27 for the shutter unit 15, in which the lock lever 28, locking the shutter unit 15 in the closure position, is mounted to the shutter unit 15, movable with respect to the main cartridge body unit 5, the lock lever may be moved in unison with the shutter unit 15 to follow up with the opening/closure of the aperture for the head part 13. As a result, the lock lever 28 may be placed such that, when the shutter unit 15 is in the position of closing the aperture for the head part 13, at least the thrust part 30 overlies the aperture for the head part 13, thus enabling the size of the disc cartridge 1 to be reduced. That is, it should be necessary to provide the space, in which to arrange the lock lever 28 in its entirety, to the main cartridge body unit 5, in case the lock lever 28 is provided to the main cartridge body unit 5. This necessity may be eliminated with the disc cartridge 1 of the present invention, such that it is only sufficient to provide solely the mating engaging part 29, engaged by a portion of the lock lever 28, with the consequence that the main cartridge body unit 5 may further be reduced in size.

The disc cartridge 1, according to the present invention, may further be provided with a shutter opening/closure unit 38 which implements reliable movement of the shutter unit 15 opening/closing the aperture for the head part 13 and which reliably holds the shutter unit 15 in the position of opening or closing the aperture for the head part 13.

This shutter opening/closure unit 38 is formed using a bi-directional energizing unit for selectively energizing the shutter unit 15 into movement in two directions, viz. in a direction of opening the aperture for the head part 13 and in a direction of closing the aperture for the head part. Specifically, the bi-directional energizing unit is formed by a torsion coil spring 39, as shown in FIG. 8. This torsion coil spring 39, mounted between the shutter unit 15 and the main cartridge body unit 5, is arranged at a location towards which the shutter unit 15 is moved in the direction of opening the aperture for the head part 13, as shown in FIG. 8. Specifically, the torsion coil spring 39 is mounted by having the distal end of an arm section 39a engaged in an engagement opening 40 formed in the distal end of the lock lever mounting piece 32 and by having a ring 41 at the distal end of the other arm section 39b engaged by a support pin 42 protuberantly formed on the inner surface of the main cartridge body unit 5.

Figure 10:
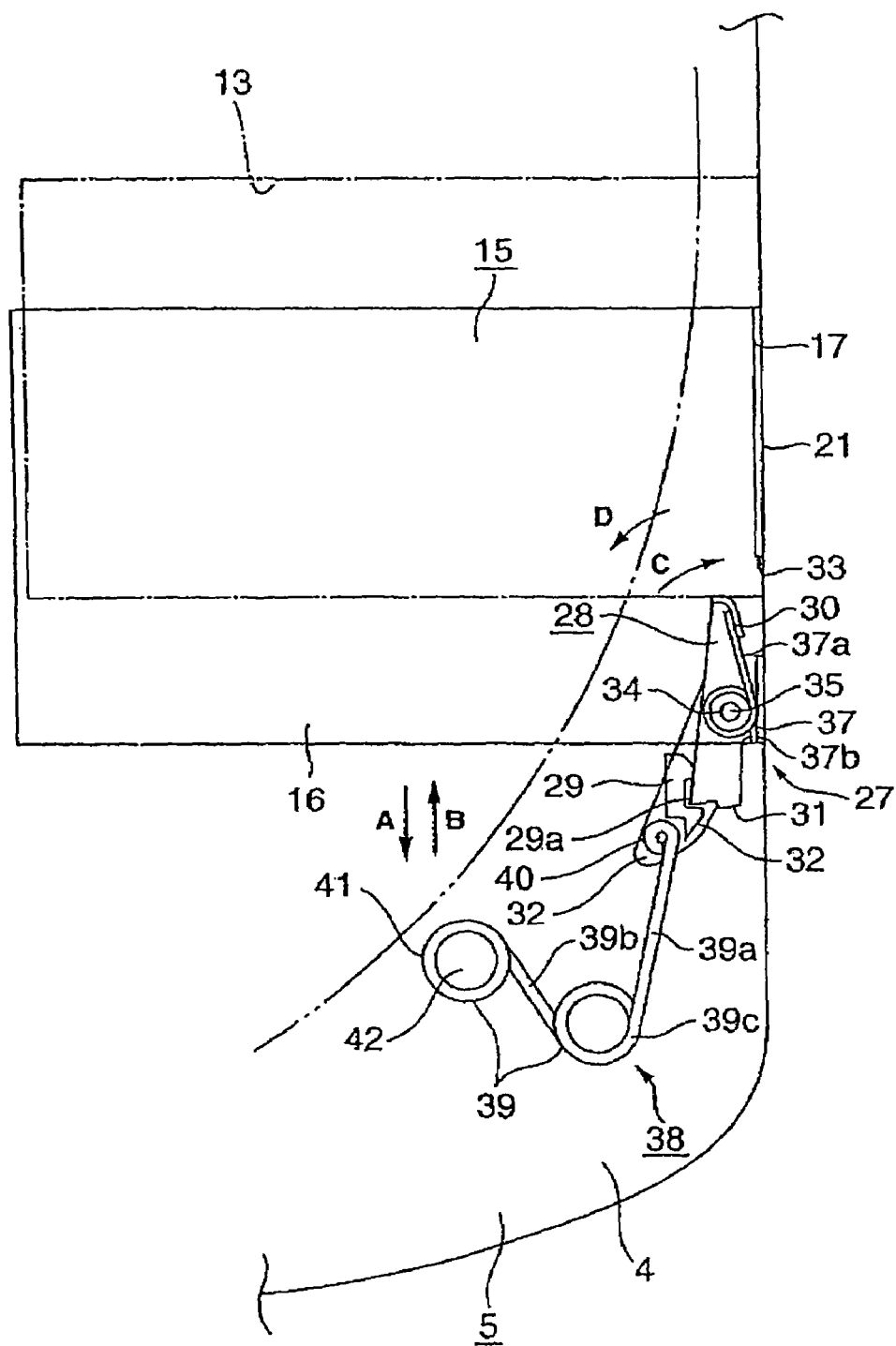
FIG. 10 is a plan view showing the state in which the shutter member is being moved in a direction of opening an aperture for a head unit.
Figure 11:
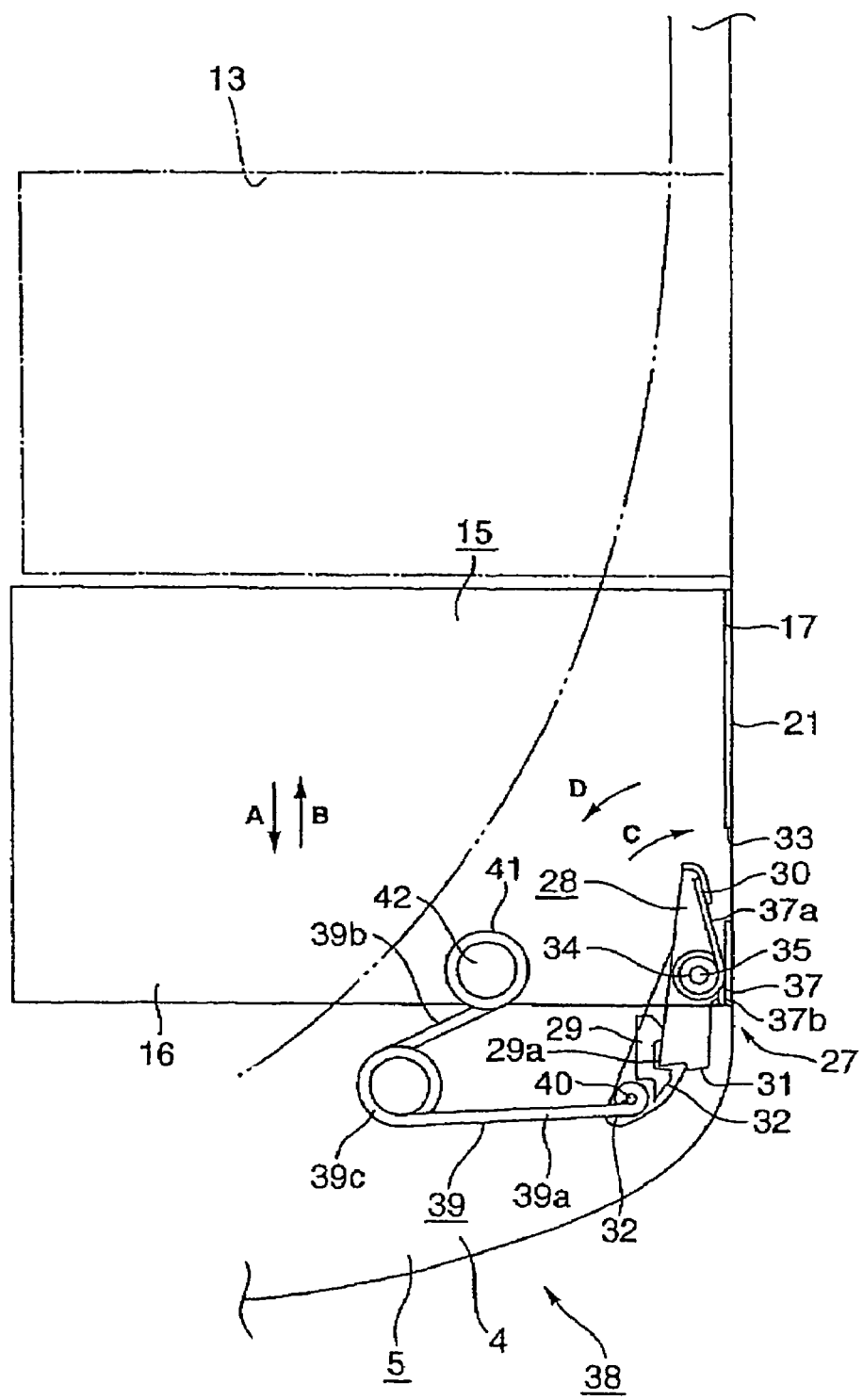
FIG. 11 is a plan view showing the state in which the shutter unit has been moved in a direction of opening the aperture for the head unit.
Figure 12:
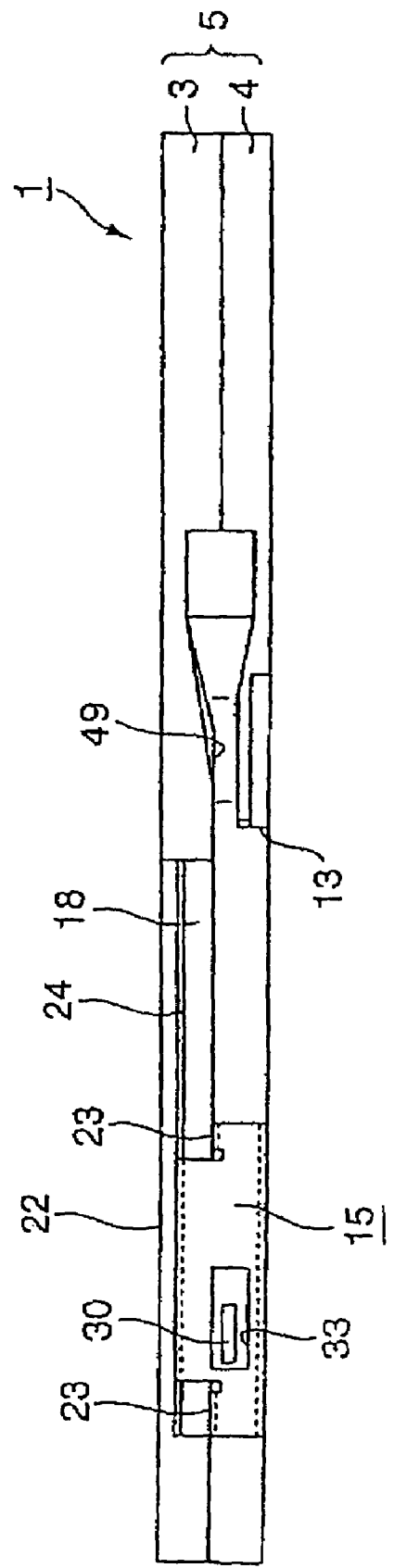
FIG. 12 is a side view of the disc cartridge showing the opened state of the aperture for the head unit.

When the torsion coil spring 39 is at the position of closing the aperture for the head part 13, the torsion coil spring 39 biases the shutter unit 15 in the direction indicated by the arrow B in FIG. 8 for retaining the state of closing the aperture for the head part 13. When the disc cartridge 1 is loaded on the disc recording and/or reproducing apparatus, and the shutter unit 15, released from the locked state by the lock unit 27 for the shutter unit, is moved relative to the main cartridge body unit 5 in the direction of the arrow A in FIG. 8 for opening the aperture for the head part 13, a coil part 39c, formed centrally of the spring in an unfixed state, is moved in the direction of arrow A, along which is moved the shutter unit 15. When the coil part 39c is further moved along the direction of the arrow A and is moved beyond the location of a support pin 42 along the direction of movement of the shutter unit 15, as shown in FIG. 10, the biasing direction is reversed. On reversion of the biasing direction, the torsion coil spring 39 biases the shutter unit 15 into movement along the arrow A in FIG. 10. Thus, the shutter unit 15 is moved in a direction of opening the aperture for the head part 13, to retain the aperture for the head part 13 in the opened position, as shown in FIGS. 11 and 12

When the disc cartridge 1, in a state in which the shutter unit 15 retains the aperture for the head part 13 in the opened position, is taken out from the disc recording and/or reproducing apparatus, by way of performing the operation for ejection, the shutter unit 15 is moved along the direction of arrow B in FIG. 10, relative to the main cartridge body unit 5, with the center coil part 39c being similarly moved along the direction of arrow B. When the shutter unit 15 is further moved along the direction of arrow B, such that it surpasses the location of the support pin 42 along the direction of movement of the shutter unit 15, the biasing direction is reversed. On reversion of the biasing direction, the torsion coil spring 39 biases the shutter unit 15 into movement along the arrow B in FIG. 9, such that the shutter unit 15 is moved in the direction of closing the aperture for the head part 13, thereby retaining the aperture for the head part in the closed state.

The shutter unit 15, biased by the torsion coil spring 39, forming the bi-directional energizing unit, is carried in the position of closing the aperture for the head part 13 and in the position of opening the aperture for the head part 13, under the biasing force of the torsion coil spring 39, and hence may be maintained reliably in the position of closing or opening the aperture for the head part 13.

In the disc cartridge 1, according to the present invention, provided not only with the lock unit 27 for the shutter unit, locking the shutter unit 15 in the closed position, but also with the shutter opening/closure unit 38, having the bi-directional energizing unit for selectively biasing the shutter unit 15 in the two directions, the shutter unit 15 may be reliably retained in the position of closing the aperture for the head part 13, while the reliable opening/closure operation for the aperture for the head part 13 may be achieved.

For reliably closing the aperture for the head part 13, it is only sufficient to provide the lock unit 27 for the shutter unit.

In the disc cartridge 1, according to the present invention, the lateral surface 8 of the main cartridge body unit 5, carrying the shutter unit 15, is formed with a guide groove 49, into which is intruded a shutter unit releasing piece, provided to the disc recording and/or reproducing apparatus, as shown in FIGS. 1, 6 and 12.

In the lower surface of the main cartridge body unit 5, on both sides of the back surface, forming the curved section 10, there are formed first and second positioning holes 43, 44, engaged by positioning pins, provided to the disc recording and/or reproducing apparatus, as shown in FIGS. 2 and 3. Meanwhile, the second positioning hole 44 is formed as an elongated hole, having the width-wise direction, lying at right angles to the direction of movement of the shutter unit 15, as a long radius.

In the lateral surfaces 8, 9, contiguous to the arcuate section 7 of the main cartridge body unit 5, there are formed engagement recesses 45, 46 for loading, engaged by a portion of a cartridge loading unit, provided to the disc recording and/or reproducing apparatus, on which is loaded the present disc cartridge 1, as shown in FIGS. 1 and 2.

In the opposite lateral side 9 of the arcuate section 7 of the main cartridge body unit 5, there is formed an engagement recess 47 for ejection, engaged by a portion of an ejection unit, provided to the disc recording and/or reproducing apparatus, as shown in FIG. 2.

In the lateral sides 8, 9 or in the bottom surface of the main cartridge body unit 5, there is also formed a discrimination hole or recess, as necessary, for discriminating the optical disc 2 housed therein.

Next, an example of the disc recording and/or reproducing apparatus in which the disc cartridge 1 according to the present invention is employed will be explained.

Figure 13:
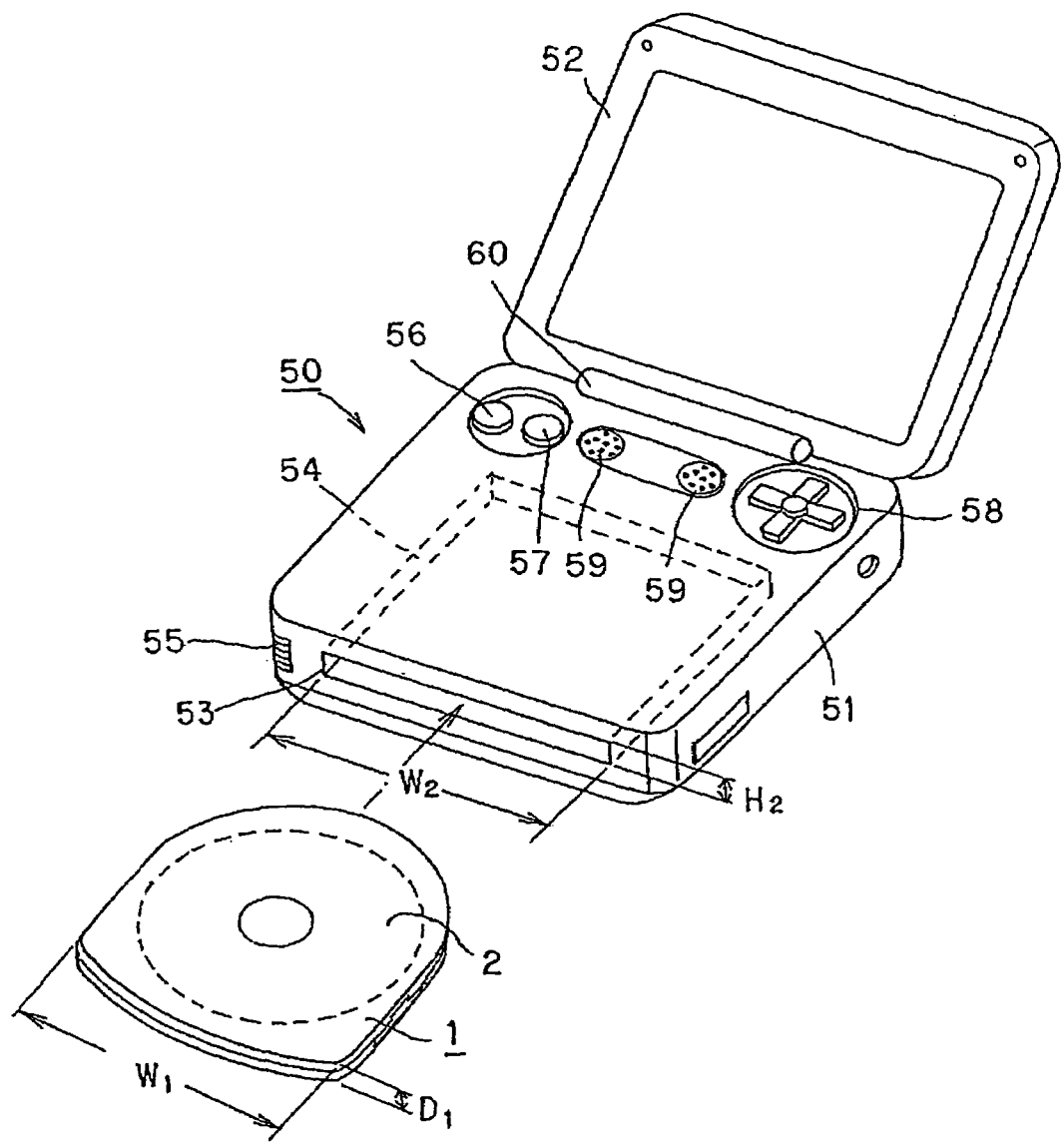
FIG. 13 is a perspective view showing an example of a disc driving unit employing the disc cartridge according to the present invention.

In the disc cartridge 1, according to the present invention, there is housed the optical disc 2, having recorded thereon the program data or video data needed for executing e.g. a TV game. The disc recording and/or reproducing apparatus, employing the disc cartridge 1 of the present invention, housing this sort of the optical disc 2, is made up by a main body unit of the apparatus 51, carrying the disc cartridge 1, and having enclosed therein a disc driving unit for reproducing at least data recorded on the optical disc, and by a display 52 for demonstrating image data or text data reproduced from the optical disc 2, as shown in FIG. 13.

Within the main body unit of the apparatus 51 of a disc driving device 50, having enclosed therein the disc driving unit, there is provided a cartridge loading unit, not shown, including a cartridge holder for loading the disc cartridge 1 thereon. In the front surface, forming one of the lateral sides of the main body unit of the apparatus 51, there is formed a cartridge inserting/ejecting opening 53 for inserting the disc cartridge 1 into a cartridge holder and for ejecting the disc cartridge 1 loaded in the cartridge holder. The cartridge inserting/ejecting opening 53 is formed as an opening just large enough to permit insertion/removal of the disc cartridge 1, and has a width W2 and a height H2 slightly larger than the width W1 and a thickness D1, respectively, of the disc cartridge 1 inserted therein. Within the main body unit of the apparatus 51, there is arranged a cartridge holder 54 facing the cartridge inserting/ejecting opening 53.

On one side of the front surface of the main body unit of the apparatus 51, there is mounted an ejection button 55 for ejecting the disc cartridge 1 held by the cartridge holder 54.

On one side of the upper surface of the main body unit of the apparatus 51, there are provided actuating buttons 56, 57 of a control switch, used for carrying out e.g. a TV game. On the other side thereof, a control key 58 for scrolling the image demonstrated on the display 52. There is also provided a loudspeaker 59 for radiating audio signals reproduced from the optical disc 2.

Although not shown, a control bobbin for e.g. a reproducing button, for controlling the disc driving unit, and an actuating button for a power supply switch, are provided to the main body unit of the apparatus 51.

The display 52 is provided on the back side, opposite to the front side, carrying the cartridge inserting/ejecting opening 53 of the main body unit of the apparatus 51, for swinging relative to the main body unit of the apparatus 51 via a hinge unit 60. The display 52 may be swung towards the main body unit of the apparatus 51 so as to be superposed on the upper surface thereof. The display 52 is formed by a liquid crystal display panel.

The state in which the disc cartridge 1 according to the present invention is loaded on the disc driving unit 50, constructed as described above, is hereinafter explained.

For loading the disc cartridge 1 on the disc driving device 50, the disc cartridge 1 is inserted via the cartridge inserting/ejecting opening 53 into the main body unit of the apparatus 51, with the arcuate section 7 as the inserting side, so as to be held on the cartridge holder 54.

Meanwhile, with the disc cartridge 1 according to the present invention, the inserting end thereof via the cartridge inserting/ejecting opening 53 is formed as the approximately semicircular arcuate section 7, so that, even when the disc cartridge 1 is inserted with a centerline P2 along the width-wise direction of the disc cartridge significantly inclined with respect to the centerline P1 along the width-wise direction of the cartridge inserting/ejecting opening 53, the disc cartridge can be smoothly inserted into the cartridge inserting/ejecting opening 53 and reliably held by the cartridge holder 54.

Figure 14:
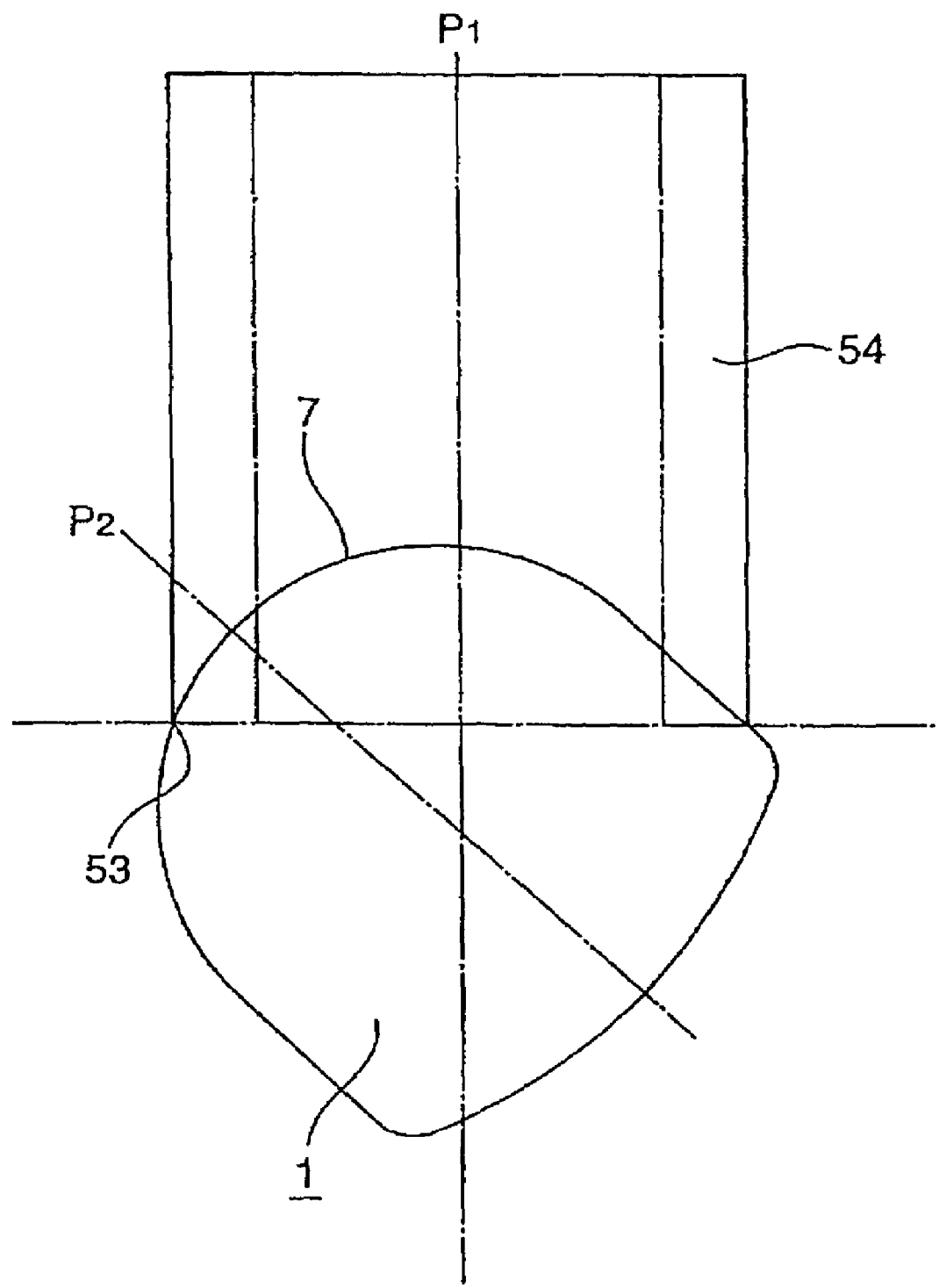
FIG. 14 is a plan view showing the state in which the disc cartridge is being inserted tilted into a cartridge insertion/ejecting opening of the disc driving unit.
Figure 15:
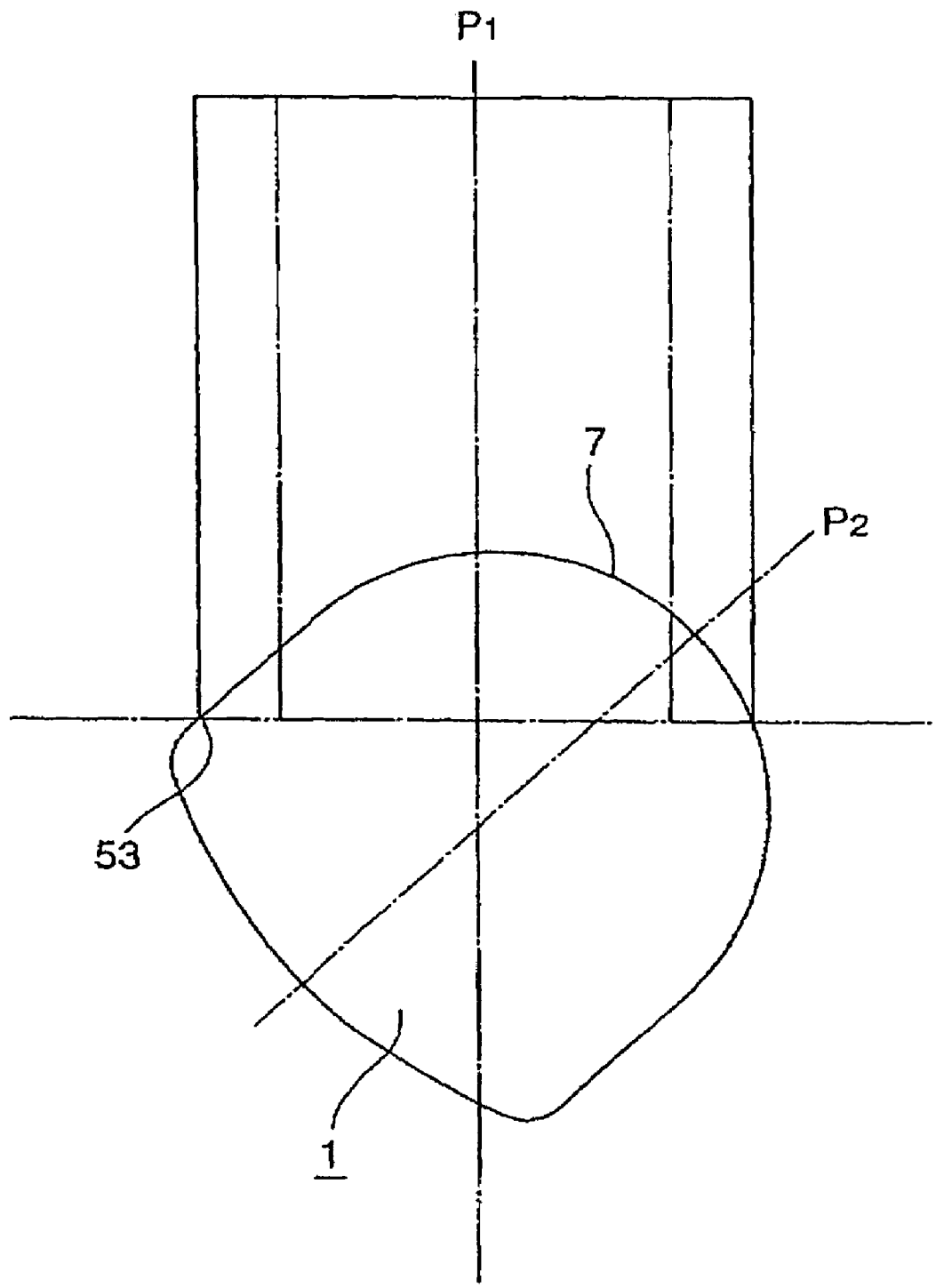
FIG. 15 is a plan view showing the state in which the disc cartridge is being inserted tilted in a distinct direction into a cartridge insertion/ejecting opening of the disc driving unit.
Figure 16:
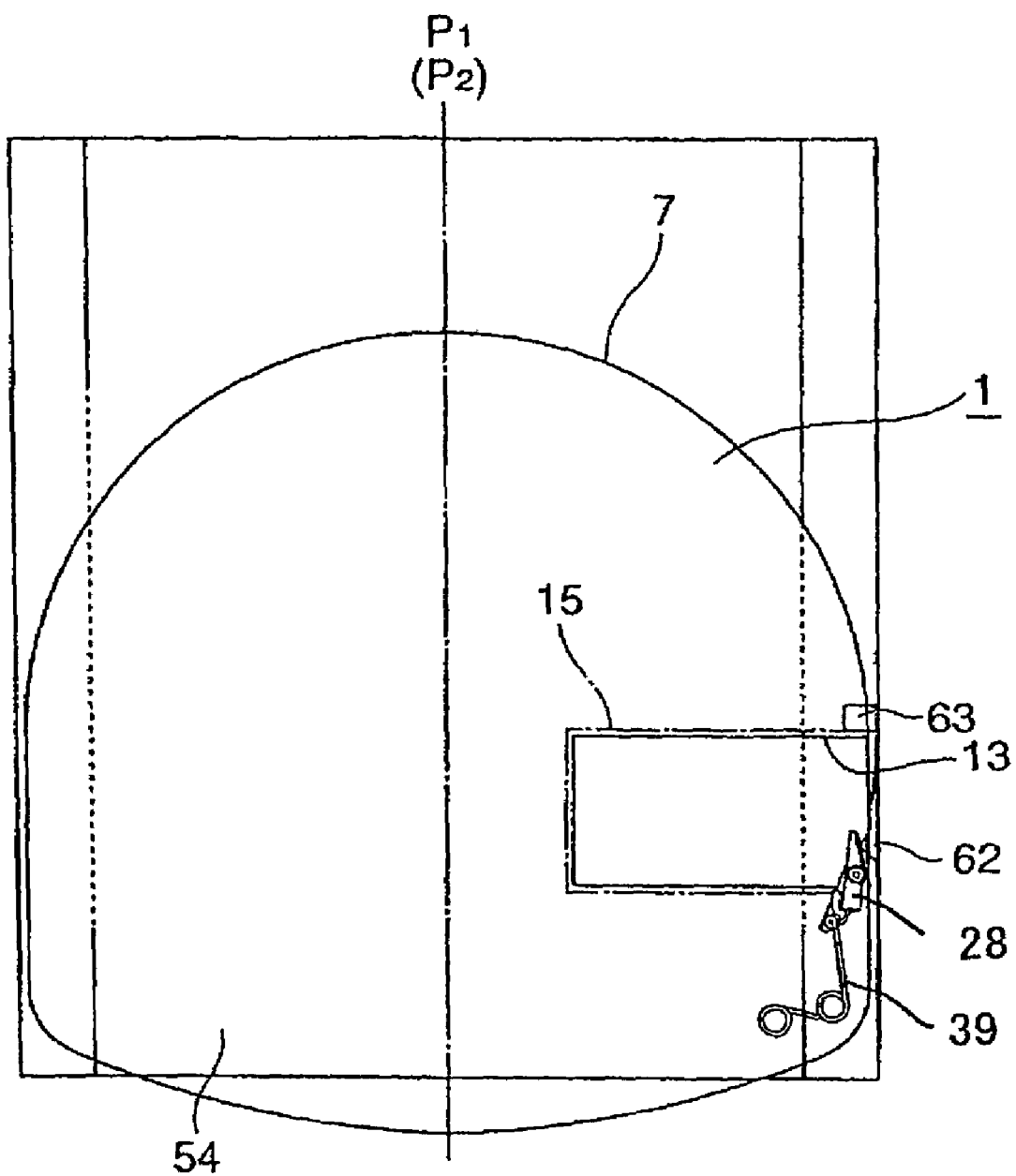
FIG. 16 is a plan view showing the state in which the disc cartridge is being inserted in a orientation-controlled state into a cartridge insertion/ejecting opening of the disc driving unit.

That is, the disc cartridge 1, having the inserting end formed as the approximately semicircular arcuate section 7, may be inserted into the main body unit of the apparatus 51 at the approximately semicircular arcuate section 7, even in case the disc cartridge 1 is inserted via the cartridge inserting/ejecting opening 53 with the width-wise centerline P2 inclined by an angle up to approximately 45° towards left or right of the width-wise centerline P1 of the cartridge inserting/ejecting opening 53, as shown in FIG. 14 or 15. At this time, the disc cartridge 1 may be corrected in its orientation by rotating it in a direction causing the coincidence of the centerlines P1 and P2, in the course of the insertion thereof through the cartridge inserting/ejecting opening 53, with the portion of the arcuate section 7, abutting against one of the lateral sides of the cartridge inserting/ejecting opening 53, as the center of rotation, as shown in FIG. 16. Thus, the disc cartridge 1, according to the present invention, may reliably be inserted into the cartridge holder 54, even in case the inserting direction thereof through the cartridge inserting/ejecting opening 53 is inclined significantly as described above.

Figure 17:
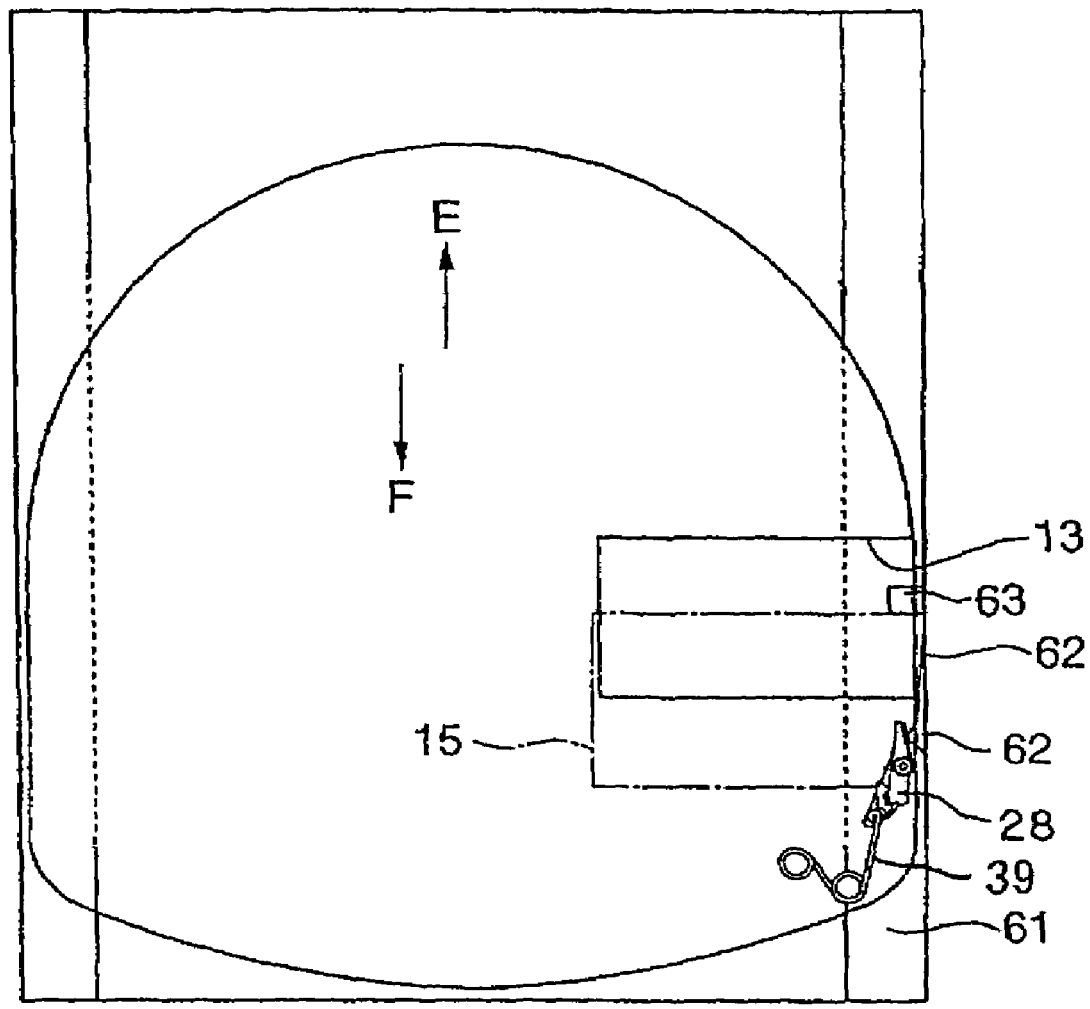
FIG. 17 is a plan view showing the state in which the disc cartridge has been inserted into a cartridge holder and in which the shutter member is unlocked.

The disc cartridge 1, inserted into the cartridge holder 54, is further introduced into the cartridge holder 54, whereby the shutter unit 15 is moved relative to the main body unit of the apparatus 51 to open the aperture for the head part 13. That is, when the disc cartridge 1 has been introduced halfway in the cartridge holder 54, as shown in FIG. 17, a portion of a shutter unit movement inhibit spring 62, formed by segmenting a part of the sidewall section of an L-shaped cartridge retention part 61 in one lateral side of the cartridge holder 54, is intruded into the window 33 formed in the connecting piece 21 of the shutter unit 15, thereby thrusting the thrust part 30 to cause rotation of the lock lever 28 in the direction indicated by arrow D in FIG. 9, as described previously. When rotated in the direction indicated by arrow D in FIG. 9, the lock lever 28 is disengaged from the mating engaging part 29 of the engagement piece 31 to release the lock of the shutter unit 15 with respect to the main cartridge body unit 5. When unlocked from the main cartridge body unit 5, the shutter unit 15 is movable relative to the main cartridge body unit 5.

The cartridge holder 54, on which is loaded the disc cartridge 1 according to the present invention, is further provided with a shutter releasing piece 63. This shutter releasing piece 63 is intruded into a guide groove 49, formed in the lateral surface 8 of the main cartridge body unit 5, until it abuts against the lateral side of the shutter unit 15.

Figure 18:
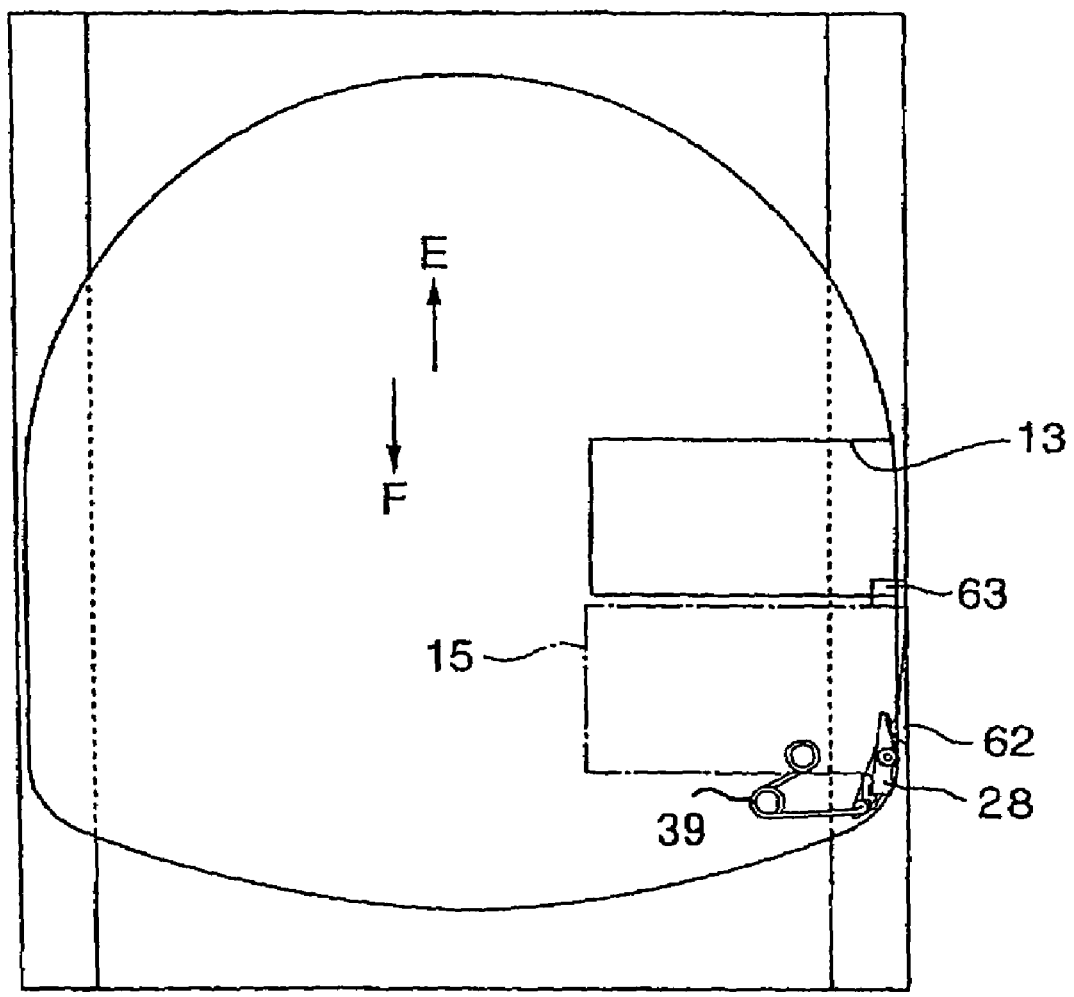
FIG. 18 is a plan view showing the state in which the disc cartridge has been inserted into a cartridge holder and in which the opening for the head unit has been opened.

When inserted into the inside of the cartridge holder 54, until unlocking of the shutter unit 15, the shutter releasing piece 63 abuts against the lateral side of the shutter unit 15, to inhibit the movement of the shutter unit 15 relative to the main cartridge body unit 5, as shown in FIG. 17. When the disc cartridge 1 is further intruded from the position shown in FIG. 17 towards the inner part of the cartridge holder 54, in the direction indicated by arrow E, the main cartridge body unit 5 is moved along the direction as indicated by arrow E, thereby opening the aperture for the head part 13, as shown in FIG. 18.

If, as the movement of the shutter unit 15 is inhibited, the disc cartridge 1 is moved in the direction indicated by arrow E in FIG. 17, with the main cartridge body unit 5 then opening the aperture for the head part 13, the torsion coil spring 39, forming the shutter opening/closure unit 38, is biased, as described above with reference to FIGS. 9 and 10. When the main cartridge body unit 5 is moved in the direction indicated by arrow E in FIG. 17, such that the coil part 39c surpasses the location of the support pin 42, lying along the direction of movement of the shutter unit 15, thus biasing the torsion coil spring 39, the biasing direction of the torsion coil spring 39 is reversed. The shutter unit 15 is then moved in the direction of arrow F in FIG. 17, opposite to the direction of movement of the main cartridge body unit 5, thus opening the aperture for the head part 13, as shown in FIGS. 11, 12 and 18. At this time, the shutter unit 15 is biased by the torsion coil spring 39 for opening the aperture for the head part 13, thus reliably retaining the aperture for the head part 13 in the opened state.

The disc cartridge 1, inserted into the cartridge holder 54, with the aperture for the head part 13 opened by the above-described operation, is loaded in position on the cartridge loading section, provided in the disc driving device 50. At this time, the optical disc 2 is loaded in position in a disc driving unit. This disc driving unit is then actuated to reproduce the optical disc 2.

For ejecting the disc cartridge 1, loaded on the disc driving device 50, after reproducing the optical disc 2, an ejection button 55 is pressed. On pressing the ejection button 55, the disc cartridge 1, loaded on the cartridge loading section, is ejected. After the ejection operation is carried out, the shutter unit 15 is moved relative to the main cartridge body unit 5 to close the aperture for the head part 13 to lock the shutter unit 15 in this position of closing the aperture for the head part 13, by the reverse of the operation, described above. By this operation of restoring the shutter unit 15 to the closure position, the ejection of the disc cartridge 1, loaded on the disc driving device 50, comes to a close.

Figure 19:
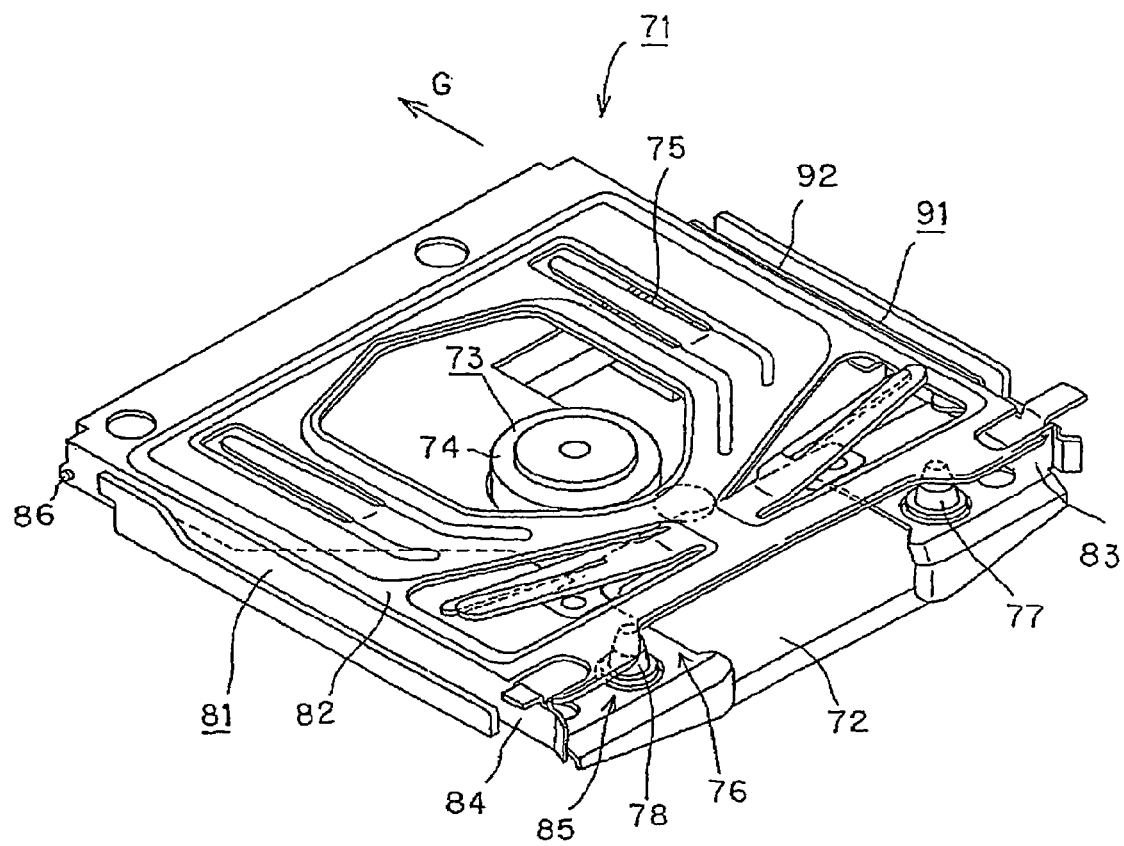
FIG. 19 is a perspective view showing a disc driving unit of the disc recording and/or reproducing apparatus on which is loaded the disc cartridge according to the present invention.

Another embodiment of the disc recording and/or reproducing apparatus, employing the disc cartridge 1 according to the present invention, is now explained. This disc recording and/or reproducing apparatus includes a disc driving unit 71, constructed as shown in FIG. 19. The disc driving unit 71, arranged in a casing, forming the main body unit of the device, includes a rectangular-shaped base 72. On this base 72 is mounted a disc rotating driving unit 73 for rotationally driving the optical disc 2 housed within the disc cartridge 1 loaded on the disc recording and/or reproducing apparatus. The disc rotating driving unit 73 is mounted on the base 72 in such a manner that a turntable 74, on which to load the optical disc 2, is protruded on the upper surface of the base 72.

There is also mounted on the base 72 an optical head unit 75 for scanning the signal recording area of the optical disc 2, loaded on the disc rotating driving unit 73 and rotationally driven in this state, for reading out the information signals recorded on the optical disc 2.

Meanwhile, in case the disc driving unit 71 is constructed to enable the recording and/or reproduction of the information signals, the optical head unit 75 used is to be of the recording and/or reproducing type.

The optical head unit 75 is carried for movement across the inner and outer rims of the optical disc 2, loaded on the disc rotating driving unit 73, via a support unit, in a manner not shown, and is fed across the inner and outer rims of the optical disc 2, by a feed unit, provided with a driving motor.

A cartridge loading section 76 is mounted on the upper surface of the base 72. The cartridge loading section 76 is provided with a pair of positioning pins 77, 78 and a pair of support pins, not shown. The disc cartridge 1, loaded on the cartridge loading section 76, is positioned in the horizontal and vertical directions, by the positioning pins 77, 78 engaging in the first and second positioning holes 43, 44 and carried by the support pins.

On the upper surface of the base 72, carrying the cartridge loading section 76, there is provided a cartridge holder 81 holding the disc cartridge 1 and which is adapted for loading/unloading the disc cartridge 1 on or from the cartridge loading section 76. The cartridge holder 81 is rectangular in shape and sized for retaining the disc cartridge 1. On opposite sides of a top plate 82, there are provided cartridge supports 83, 84 each being of an L-shaped cross-section. The opened front side of the cartridge holder 81 is formed as a cartridge inserting/ejecting opening 85. The disc cartridge 1 of the present invention is inserted into or ejected from the cartridge inserting/ejecting opening 85, with the front side arcuate section 7 as the inserting end.

This cartridge holder 81 is carried for rotation by the base 72 via pivot shafts 86 provided on both sides of the back side opposite to the side forming the cartridge inserting/ejecting opening 85.

The disc cartridge 1 is inserted into or ejected from the cartridge holder 81 as the cartridge holder is rotated to above the base 72. The cartridge holder 81 is rotated towards the base 72, as the disc cartridge 1 is inserted and held therein, for loading the disc cartridge 1 in position on the cartridge loading section 76.

The cartridge holder 81 is provided with a shutter opening unit 91 for opening the aperture for the head part 13 when the disc cartridge 1 is inserted into the cartridge holder 81. This shutter opening unit 91 is formed by mounting an elongated spring plate 92 and by providing a shutter opening part 93 on the distal end of the spring plate 92 for protruding into the inside of the cartridge holder 81, as shown in FIG. 19. The spring plate 92 has its proximal end 92a secured to an outer lateral side of the cartridge support 83. The shutter opening part 93 is formed by folding back a portion of the distal end of the spring plate 92. The shutter opening part 93 is protruded into the inside of the cartridge support 83 via a cut-out 83a formed in the lateral side of the cartridge support 83.

Figure 20:
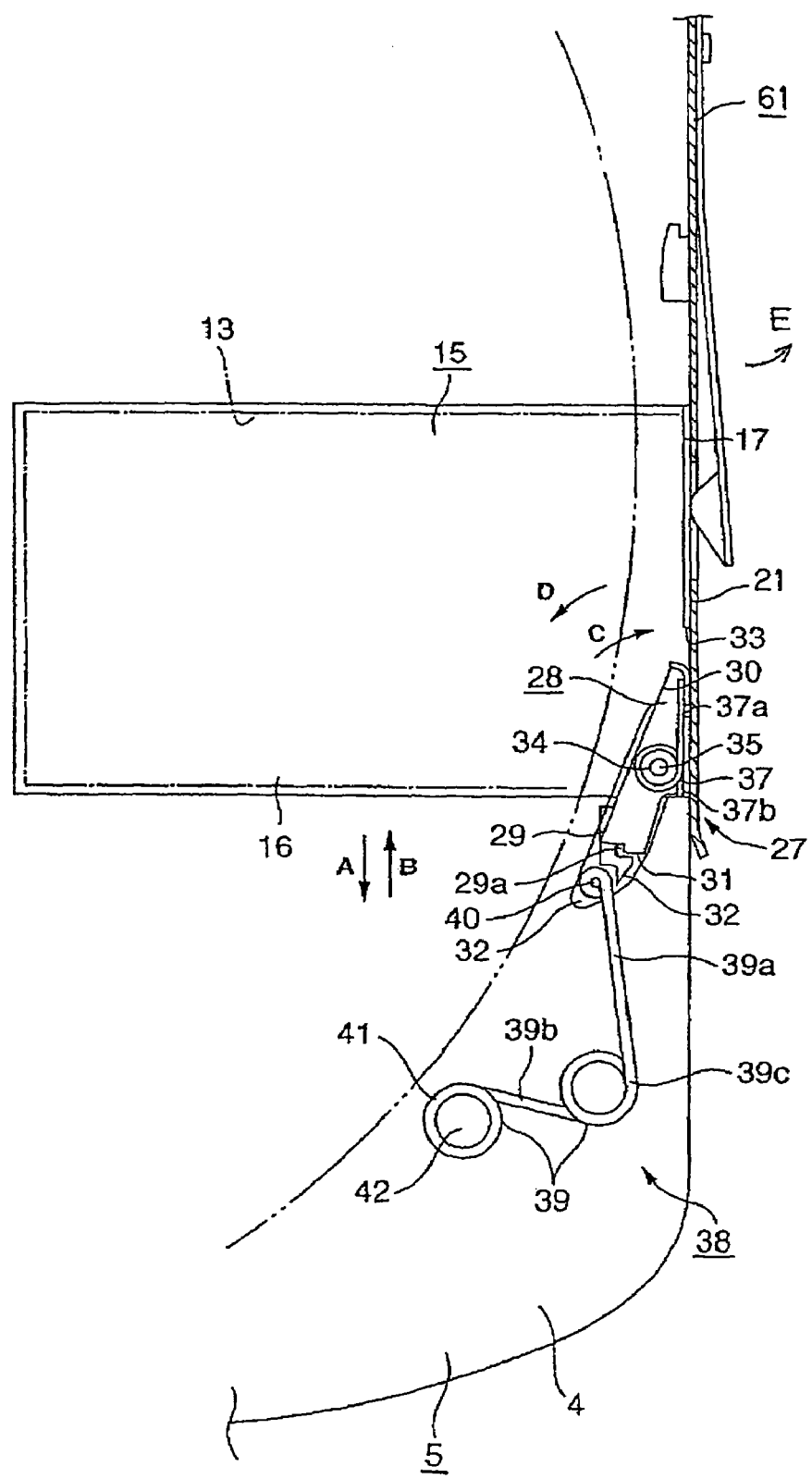
FIG. 20 is a plan view showing the state in which the disc cartridge is being inserted into a cartridge holder.

When the disc cartridge 1 is inserted into the cartridge holder 81, the shutter opening unit 91 is introduced via window 33 provided in the shutter unit 15 to thrust the thrust part 30 to cause the lock lever 28 to be rotated in the direction indicated by arrow D in FIG. 20 against the bias of the rotational force energizing spring 37. When the lock lever 28 is rotated in the direction of arrow D in FIG. 20, the engagement piece 31 is disengaged from the engagement recess 29a of the mating engaging part 29 to unlock the shutter unit 15.

The state in which the disc cartridge 1 is introduced into the cartridge holder 81, provided with the shutter opening unit 91, described above, to cause movement of the shutter unit 15 to open the aperture for the head part 13, is now explained in further detail.

When the disc cartridge 1 is introduced into the cartridge holder 81, with the arcuate section 7 as an introducing end, the shutter opening part 93 rides on the connecting piece 21 of the shutter unit 15, as shown in FIG. 20. At this time, the spring plate 92 is flexed in a direction indicated by arrow E in FIG. 20, to cause the shutter opening part 93 to clear the cartridge holder 81, by the shutter opening part 93 being thrust by the connecting piece 21.

Figure 21:
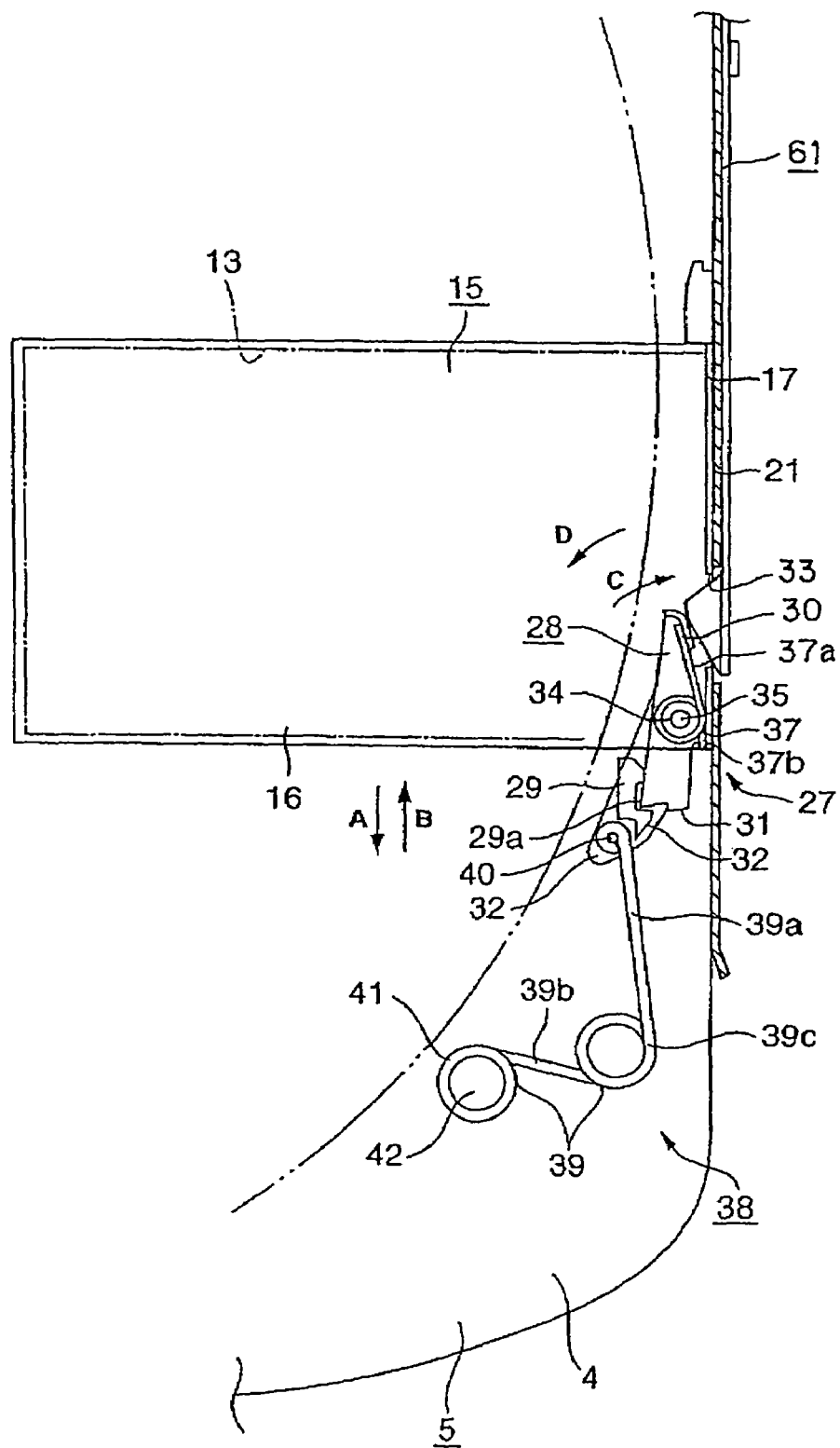
FIG. 21 is a plan view showing the state in which the disc cartridge has been inserted into the cartridge holder and in which the shutter member has been locked in the state of closing the opening for the head unit.
Figure 22:
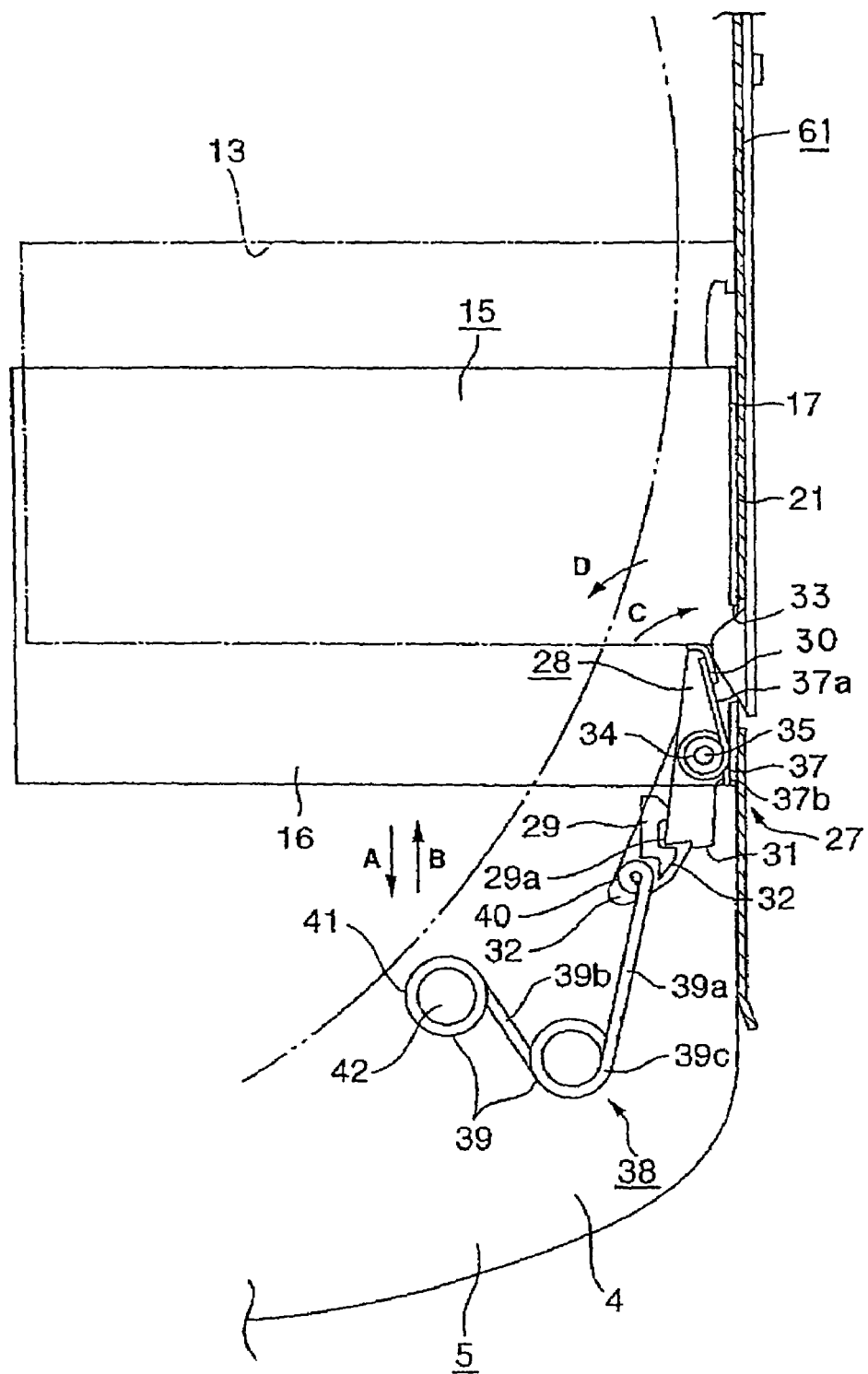
FIG. 22 is a plan view showing the state in which the opening for the head unit of the disc cartridge loaded on the cartridge holder has been opened.

If the disc cartridge 1 is introduced further into the cartridge holder 81, as indicated by arrow G in FIG. 19, until the shutter opening part 93 faces the window 33 in the connecting piece 21, the spring plate 92, so far flexed, is elastically restored in the direction indicated by arrow F in FIG. 21, so that the shutter opening part 93 at the distal end thereof is intruded into the window 33. The shutter opening part 93, intruded into the window 33, thrusts the thrust part 30 to flex the lock lever 28 in the direction indicated by arrow D in FIG. 21, against the bias of the rotational force energizing spring 37. When the lock lever 28 is rotated in the direction indicated by arrow D in FIG. 21, the engagement piece 31 is disengaged from the engagement recess 29a of the mating engaging part 29 to unlock the shutter unit 15. As a result, the shutter unit 15 is movable in the direction of opening the aperture for the head part 13. The state of the shutter unit 15 is such that the shutter opening part 93 is engaged in the window 33. If the disc cartridge 1 is further intruded from this state into the inside of the cartridge holder 81, the main cartridge body unit 5 is moved relative to the shutter unit 15 to open the aperture for the head part 13. When the disc cartridge 1 is inserted up to a preset location in the cartridge holder 81, the aperture for the head part 13 in its entirety is opened.

Meanwhile, when the disc cartridge 1 has been introduced into the cartridge holder 81, the shutter opening part 93 is retained engaged in the window 33, so that the shutter unit 15 retains the aperture for the head part 13 in the opened state.

The disc cartridge 1, introduced into the cartridge holder 81, with the aperture for the head part 13 in the opened state, is loaded in position on the cartridge loading section 76, by rotation of the cartridge holder 81 towards the cartridge loading section 76, as described above.

By loading the disc cartridge 1 on the cartridge loading section 76, the optical disc 2, housed within the disc cartridge 1, is loaded on the disc table 74 and may now be run in rotation by the disc rotating driving unit 73. At this time, the optical head unit 75 faces the optical disc 2 via the aperture for the head part 13 in the opened state. The disc rotating driving unit 73 may now be driven to actuate the optical head unit 75 to reproduce the information signals recorded on the optical disc 2.

For ejecting the disc cartridge 1, loaded on the cartridge loading section 76, the reproducing operation for the optical disc 2 is halted and an ejection unit provided to the disc recording and/or reproducing apparatus is actuated to cause rotation of the cartridge holder 81 to a position uplifted from the base 72 separated from the cartridge loading section 76. This causes the back side of the disc cartridge 1 to be protruded from the cartridge inserting/ejecting opening 85. If now the portion of the disc cartridge 1 protruded from the cartridge inserting/ejecting opening 85 is gripped to take out the disc cartridge 1 from the cartridge holder 81, the main cartridge body unit 5 is moved relative to the shutter unit 15, retained by the shutter opening unit 91, to cause movement of the shutter unit 15 to be moved to a position of closing the aperture for the head part 13. If now the disc cartridge 1 is pulled out from the cartridge holder 81, the shutter opening part 93 is disengaged from the window 33 to release the thrusting of the lock lever 28. When released from the thrusting by the shutter opening unit 91, the lock lever 28 is elastically restored under the force of the lock lever 28 rotational force energizing spring 37. The state of the lock lever 28 is such that the engagement piece 31 is engaged with the engagement recess 29a in the mating engaging part 29 to inhibit the movement of the shutter unit 15, with the shutter member 16 closing the aperture for the head part 13.

With the disc recording and/or reproducing apparatus, employing the disc cartridge 1 according to the present invention, in which a simple structure composed of the spring plate 92, at one end of which there is provided the shutter opening part 93, may be used as the shutter opening unit 91, the apparatus may be reduced in size.

Meanwhile, the operation of the shutter opening/closure unit 38 for selectively biasing the shutter unit 15 in two directions, that is, in the directions of opening and closing the aperture for the head part 13, depending on the position of movement of the shutter unit 15, is the same as that described above and hence the detailed explanation is omitted for simplicity.

Although the disc cartridge 1 having the replay-only optical disc 2 housed therein has been explained in the foregoing, the present invention may similarly be applied to a recording and/or reproducing optical disc adapted for re-recording the information signals or other types of the recording mediums with comparable merits.

The present invention is not limited to the embodiments described above with reference to the drawings, such that various modifications or substitutions that may be apparent to those skilled in the art may be implemented without departing from the scope of the invention as set forth and defined in the claims.

The invention claimed is:

1. A shutter unit for a disc cartridge comprising:
  a shutter unit for opening/closing an aperture of a disc cartridge, having a disc accommodated in the inside thereof, said aperture serving for exposing a portion of a recording area of said disc to outside;
  a lock member rotationally mounted to said shutter unit; and
  biasing means for biasing said shutter unit in a direction of engaging said lock member with an engagement part provided to said disc cartridge, wherein said lock member comprises an elongated plate-shaped member which includes a thrust part on one side and an engagement piece on an opposite side, wherein said thrust part is adapted for rotationally engaging a connecting piece provided to said shutter unit and said engagement piece is adapted for rotationally engaging said engagement part.

2. A disc cartridge comprising:
  a disc;
  a main cartridge body unit having said disc rotatably housed therein and including an aperture for exposing a part of said disc across the inner and outer rims of the disc;
  a shutter unit mounted movably to said main cartridge body unit for opening or closing said aperture;
  a lock member for locking said shutter unit in a position of closing said aperture;
  an engagement part provided to said main cartridge body unit for rotational engagement by said lock member; and
  a biasing member for biasing said lock member in a direction of engaging with said engagement part, wherein said lock member comprises an elongated plate-shaped member which includes a thrust part on one side and an engagement piece on an opposite side, wherein said thrust part is adapted for rotationally engaging a connecting piece provided to said shutter unit and said engagement piece is adapted for rotationally engaging said engagement part.

3. The disc cartridge according to claim 2 wherein said lock member is rotated by a shutter unit movement controlling means so as to be disengaged from said engagement part, said shutter unit movement controlling means being mounted to a recording and/or reproducing apparatus for controlling the movement of said shutter unit relative to said main cartridge body unit.

4. The disc cartridge according to claim 2 wherein an inserting end of said main cartridge body unit into a recording and/or reproducing apparatus is a substantially semicircular arcuate section, centered about the center of said disc, accommodated in said main cartridge body unit, said aperture being formed for opening to a lateral side of said main cartridge body unit other than the lateral side formed as said arcuate section.

5. The disc cartridge according to claim 4 wherein said shutter unit is moved along the lateral side of said main cartridge body unit other than the lateral side formed as said arcuate section for opening/closing a recording and/or reproducing aperture.

6. A recording and/or reproducing apparatus comprising:
- a cartridge holder into which is inserted a disc cartridge including a disc, a main cartridge body unit having said disc rotatably housed therein and including an aperture for exposing a part of said disc across the inner and outer rims of the disc, a shutter unit mounted movably to said main cartridge body unit for opening or closing said aperture, a lock member for locking said shutter unit in a position of closing said aperture, an engagement part provided to said main cartridge body unit for rotational engagement by said lock member, and a biasing member for biasing said lock member in a direction of engaging with said engagement part;
- a shutter unit movement controlling part provided to one side of said cartridge holder; and
- a recording and/or reproducing unit for recording and/or reproducing the information from said disc cartridge introduced into said cartridge holder; wherein:
- said lock member comprises an elongated plate-shaped member which includes a thrust part on one side and an engagement piece on an opposite side, wherein said thrust part is adapted for rotationally engaging a connecting piece provided to said shutter unit and said engagement piece is adapted for rotationally engaging said engagement part; and
- said lock member is adapted to be rotated by said shutter unit movement controlling part when said disc cartridge is introduced into said cartridge holder to release the engagement by said engagement part.

* * * * *